(12) United States Patent
Ori et al.

(10) Patent No.: US 9,477,070 B2
(45) Date of Patent: *Oct. 25, 2016

(54) ZOOM LENS AND IMAGING APPARATUS

(71) Applicant: FUJIFILM Corporation, Tokyo (JP)

(72) Inventors: Tetsuya Ori, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,801

(22) Filed: Apr. 20, 2015

(65) Prior Publication Data
US 2015/0309290 A1    Oct. 29, 2015

(30) Foreign Application Priority Data
Apr. 25, 2014  (JP) ................. 2014-091619

(51) Int. Cl.
| G02B 15/14 | (2006.01) |
| G02B 13/18 | (2006.01) |
| G02B 9/60 | (2006.01) |
| G02B 15/17 | (2006.01) |
| G02B 15/16 | (2006.01) |
| G02B 27/00 | (2006.01) |
| G02B 13/00 | (2006.01) |
| G02B 9/62 | (2006.01) |
| G02B 5/00 | (2006.01) |
| G02B 15/20 | (2006.01) |
| G02B 27/64 | (2006.01) |

(Continued)

(52) U.S. Cl.
CPC ............ *G02B 15/17* (2013.01); *G02B 15/161* (2013.01); *G02B 5/005* (2013.01); *G02B 9/60* (2013.01); *G02B 9/62* (2013.01); *G02B 13/001* (2013.01); *G02B 13/006* (2013.01); *G02B 13/009* (2013.01); *G02B 13/0045* (2013.01); *G02B 13/18* (2013.01); *G02B 15/14* (2013.01); *G02B 15/20* (2013.01); *G02B 27/0025* (2013.01); *G02B 27/646* (2013.01)

(58) Field of Classification Search
CPC ............ G02B 13/0045; G02B 27/646; G02B 27/0025; G02B 9/62; G02B 9/60; G02B 13/18; G02B 15/20; G02B 5/005; G02B 13/009; G02B 15/14; G02B 13/001; G02B 13/006
USPC ....... 359/557, 713, 714, 683–687, 739, 740, 359/757, 765
See application file for complete search history.

(56) References Cited

U.S. PATENT DOCUMENTS

| 2013/0242165 A1* | 9/2013 | Otake ................. G02B 15/17 359/683 |
| 2015/0309291 A1* | 10/2015 | Ori ................. G02B 15/17 359/683 |

FOREIGN PATENT DOCUMENTS

| JP | 2013-195748 | 9/2013 |
| JP | 2014-044249 | 3/2014 |

*Primary Examiner* — Evelyn A Lester
(74) *Attorney, Agent, or Firm* — Young & Thompson

(57) ABSTRACT

A five-group zoom lens including, in order from the object side, positive, negative, negative, positive, and positive groups. The first group includes a negative meniscus lens with the concave surface toward the image side, a positive lens and a positive lens. The second group includes a negative lens with the image-side surface having an absolute value of curvature radius smaller than that of the object side surface, a biconcave lens, and a biconvex lens. The third group includes a negative lens with the object side surface having an absolute value of curvature radius smaller than that of the image-side surface, and is moved during focusing on a closer object. The fifth group includes a positive fifth-A group including a biconvex lens, and a negative fifth-B group including a biconcave lens and a biconvex lens, wherein condition expression (1) is satisfied:

$$0.22 < fW/f1 < 0.27 \qquad (1).$$

19 Claims, 12 Drawing Sheets

FIG.1 EXAMPLE 1

FIG.3
EXAMPLE 2
WIDE ANGLE END
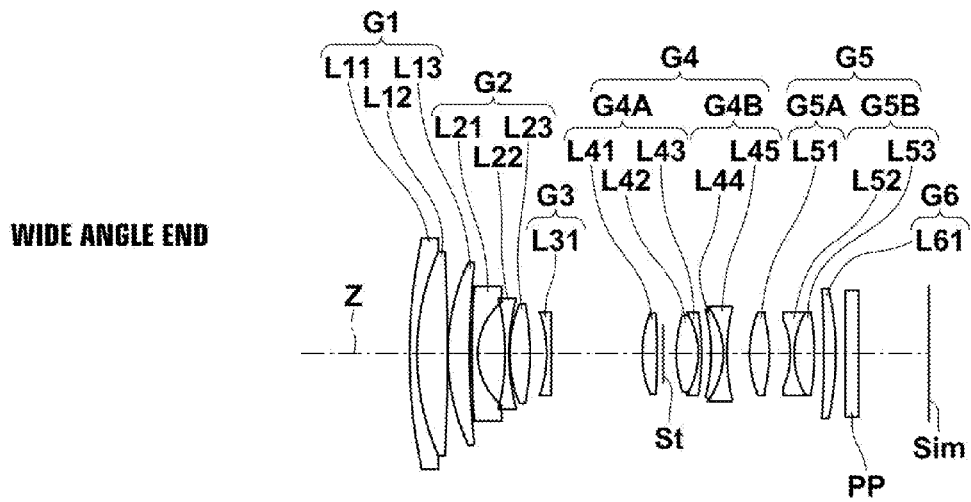
MIDDLE
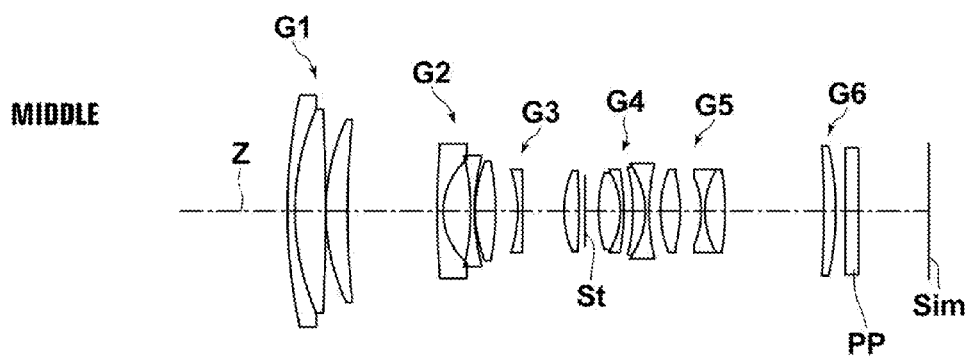
TELEPHOTO END
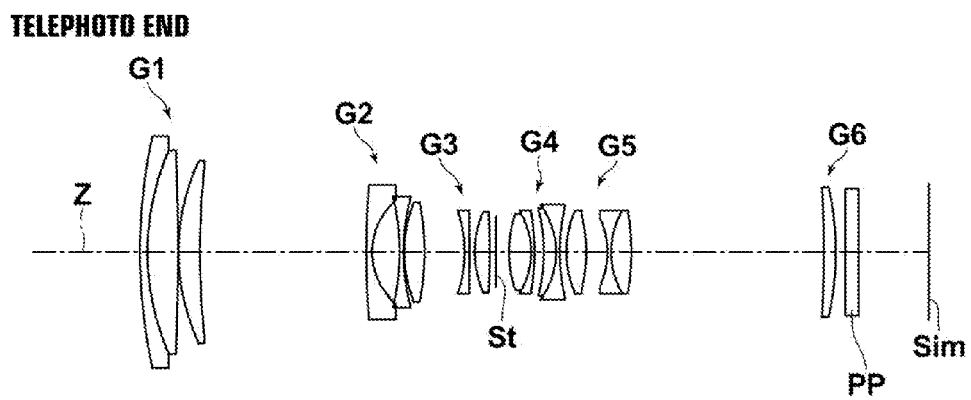

FIG.4
EXAMPLE 3
WIDE ANGLE END
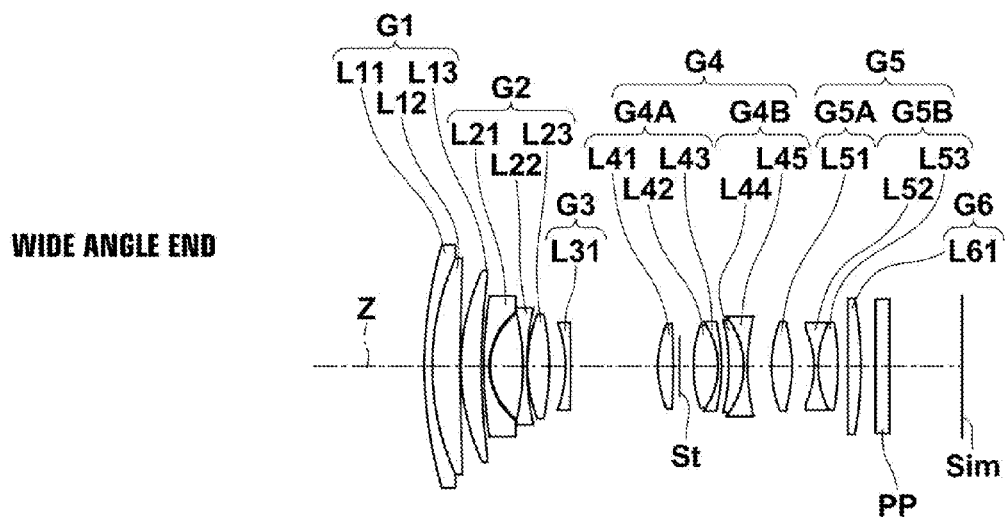
MIDDLE
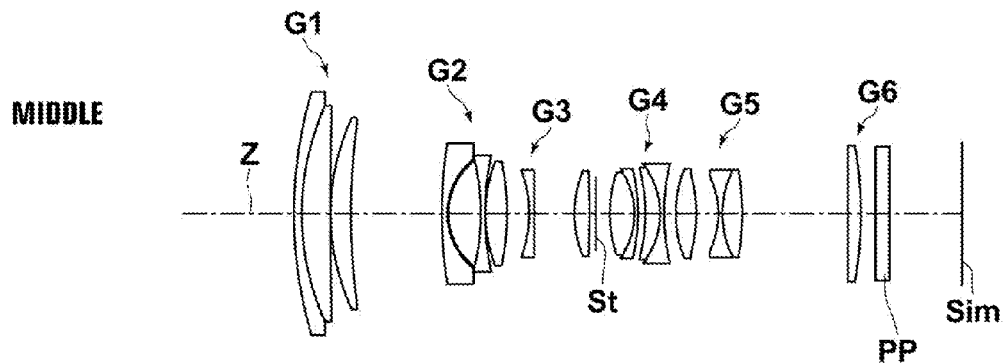
TELEPHOTO END
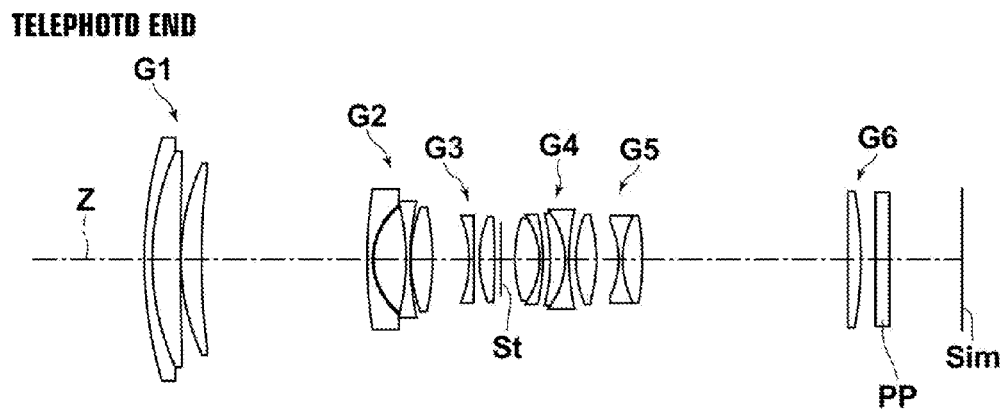

FIG.5
EXAMPLE 4
WIDE ANGLE END
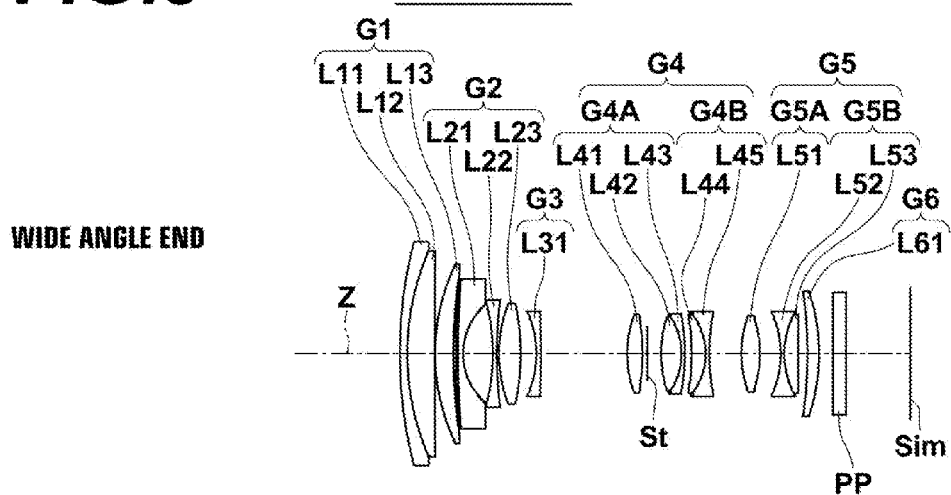
MIDDLE
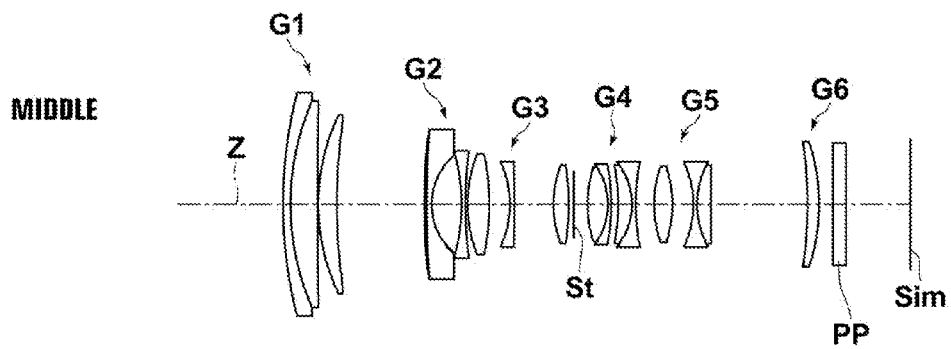
TELEPHOTO END
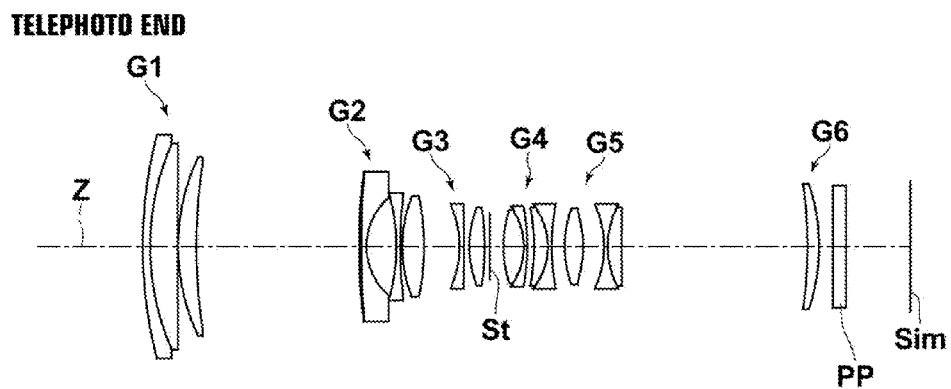

FIG.6
EXAMPLE 5
WIDE ANGLE END
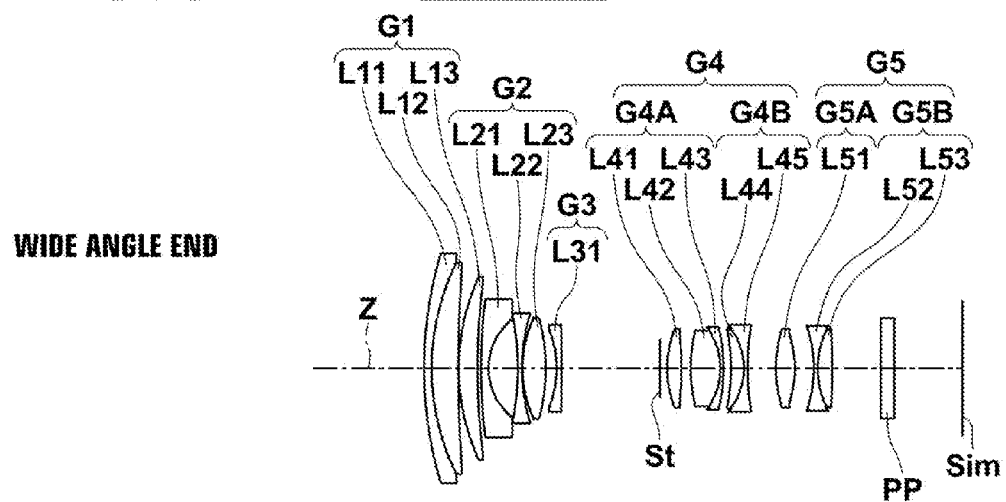
MIDDLE
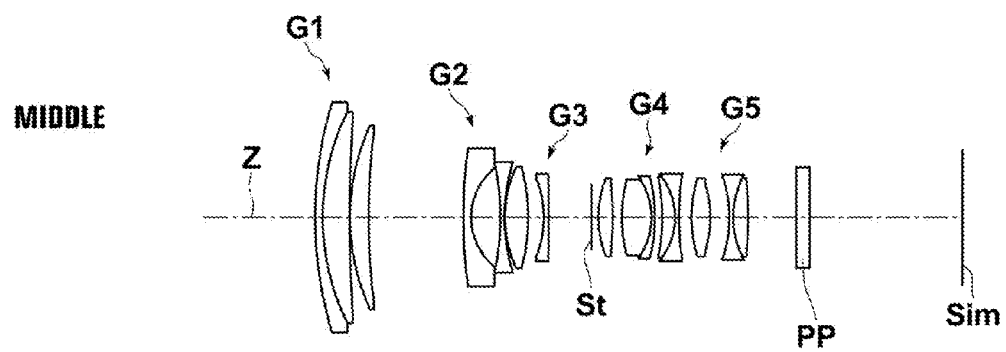
TELEPHOTO END
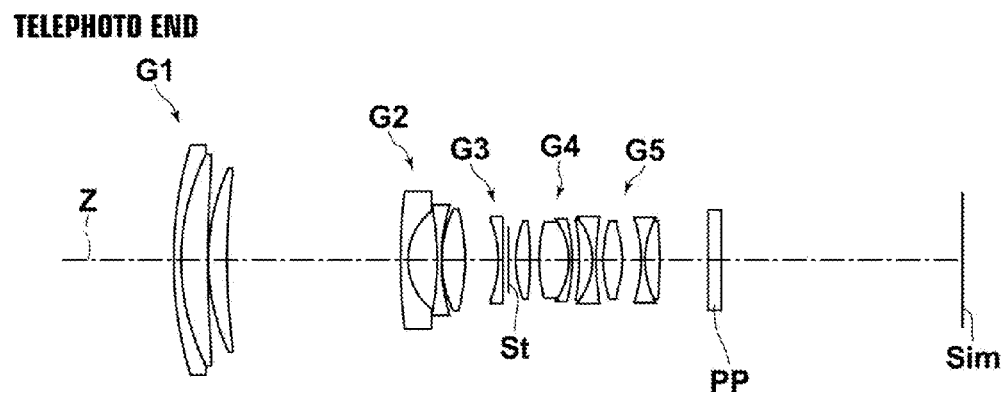

FIG.9
EXAMPLE 3
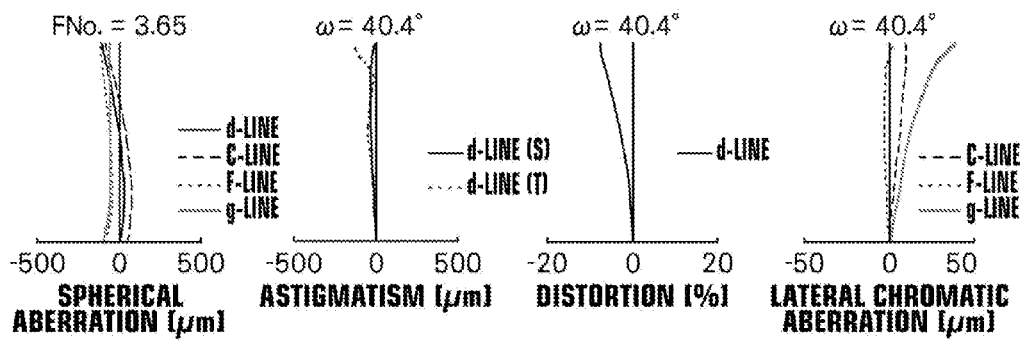
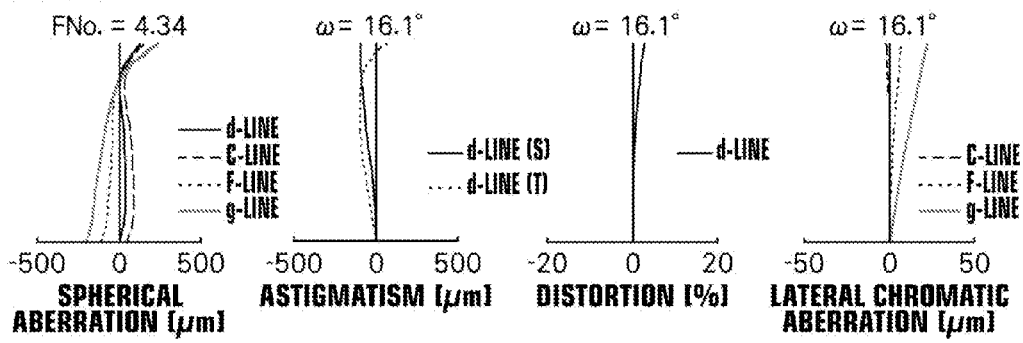
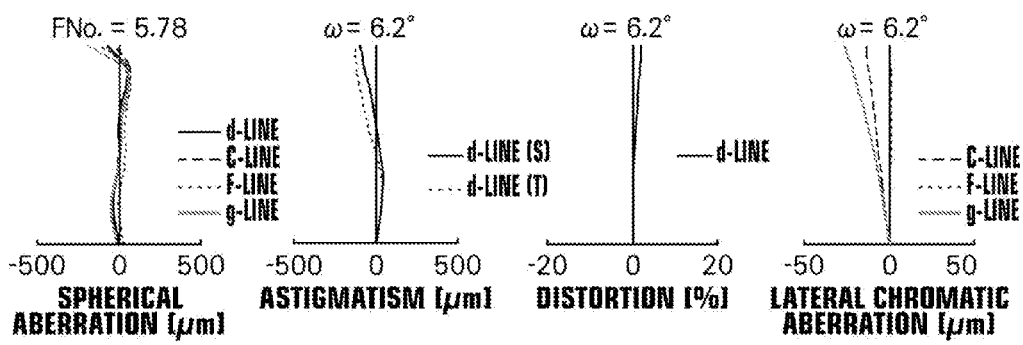

FIG.10
EXAMPLE 4
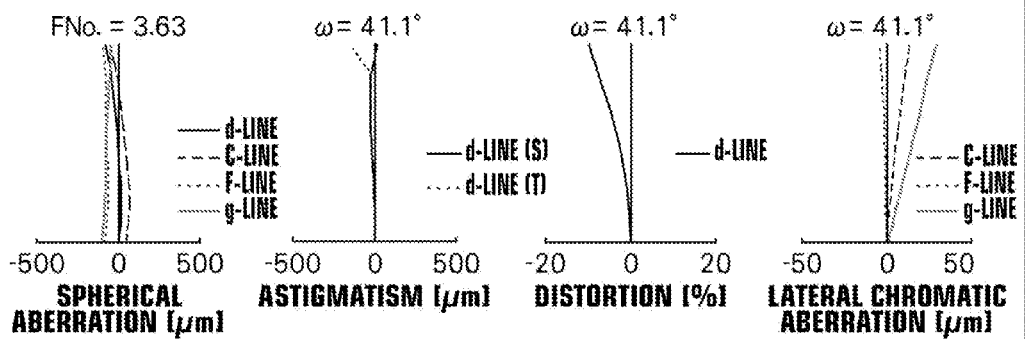
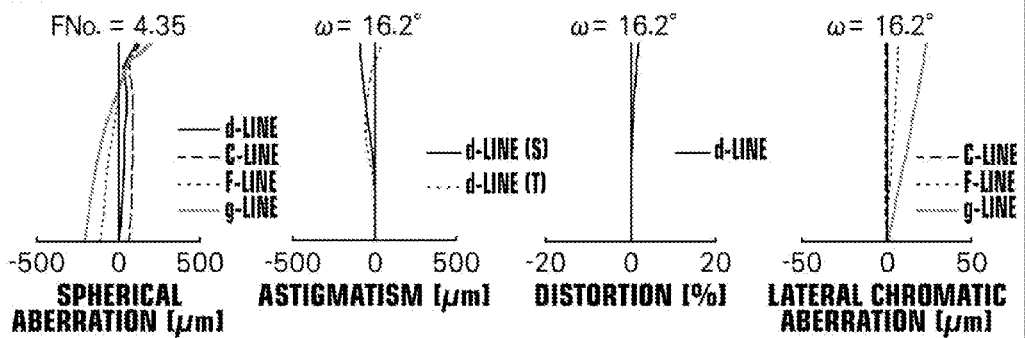
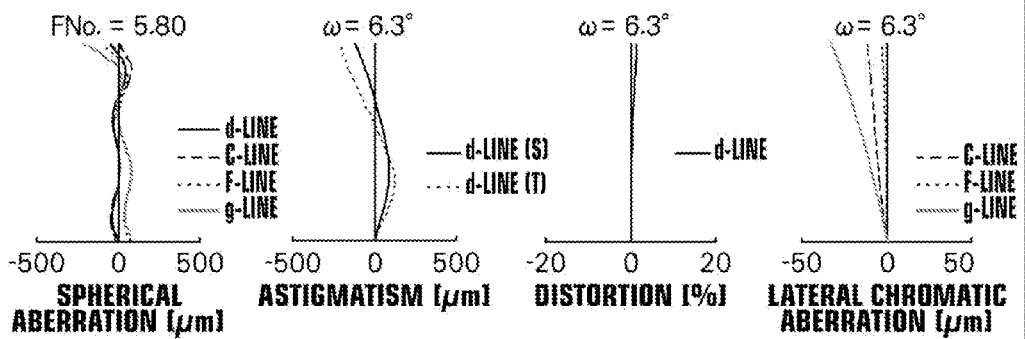

FIG.11
EXAMPLE 5
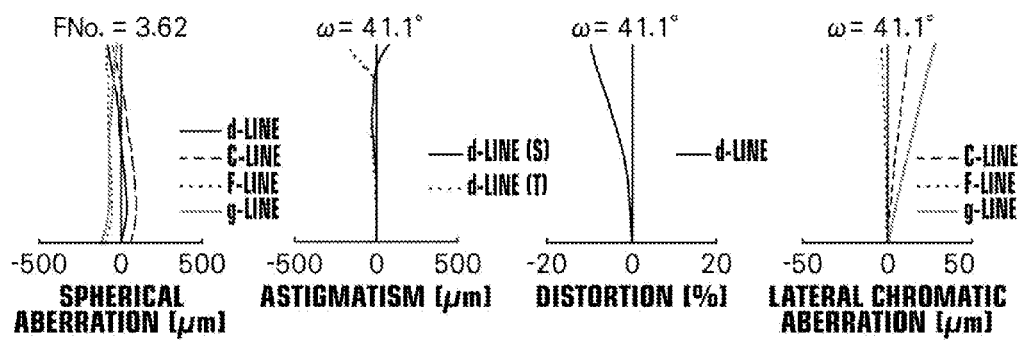
WIDE ANGLE END
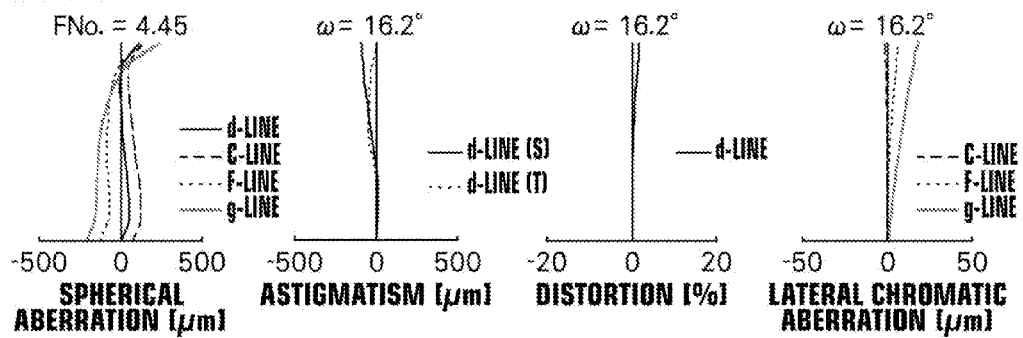
MIDDLE
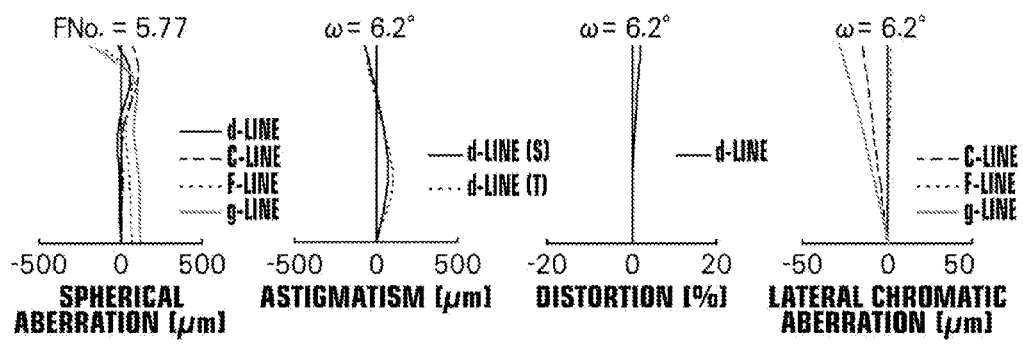
TELEPHOTO END

ZOOM LENS AND IMAGING APPARATUS

CROSS-REFERENCE TO RELATED APPLICATIONS

The present application claims priority under 35 U.S.C. §119 to Japanese Patent Application No. 2014-091619, filed on Apr. 25, 2014. The above application is hereby expressly incorporated by reference, in its entirety, into the present application.

BACKGROUND OF THE INVENTION

1. Field of the Invention

The present invention relates to a zoom lens for use with a digital camera, such as a single-lens reflex camera or mirrorless camera, a video camera, a broadcasting camera, a monitoring camera, etc., and an imaging apparatus provided with the zoom lens.

2. Description of the Related Art

With respect to zoom lenses for use with digital cameras, such as single-lens reflex cameras or mirrorless cameras, video cameras, broadcasting cameras, monitoring cameras, etc., a four-group zoom lens consisting of positive, negative, positive, and positive lens groups is well known as a type of zoom lens that is suitable for achieving high magnification. In recent years, in order to speed up autofocus, a lens type where part of the lens groups is divided to effect focusing by moving fewer lenses has appeared.

In particular, with a type where a negative third lens group is disposed on the image side of a negative second lens group and focusing is effected by moving the third lens group, a necessary amount of movement for focusing in particular at the telephoto side is smaller than that with other types of zoom lenses.

Further, in view of ensuring a distance of movement for focusing at the telephoto side and shortening the closest distance at which the lens can be focused, it is advantageous to move the lens groups during magnification change from the wide-angle end to the telephoto side such that the distance between the second lens group and the third lens group is increased.

As the above-described five-group zoom lens consisting of positive, negative, negative, positive, and positive lens groups, those disclosed in Example 1 of Japanese Unexamined Patent Publication No. 2013-195748 (hereinafter, Patent Literature 1) and Example 1 of Japanese Unexamined Patent Publication No. 2014-044249 (hereinafter, Patent Literature 2) are known.

SUMMARY OF THE INVENTION

Along with the recent trend toward more and more compact digital cameras with higher image quality, there are increasing demands for zoom lenses having a high magnification and a smaller entire length. However, the zoom lens of Example 1 of Patent Literature 1 has a long entire length, and the zoom lens of Example 1 of Patent Literature 2 has an insufficient zoom magnification, and they do not meet the above-described demands.

In view of the above-described circumstances, the present invention is directed to providing a zoom lens having a high magnification and a short entire length, and an imaging apparatus provided with the zoom lens.

An aspect of the zoom lens of the invention comprising, consecutively in order from the object side, a first lens group having a positive refractive power, a second lens group having a negative refractive power, a third lens group having a negative refractive power, a fourth lens group having a positive refractive power, and a fifth lens group having a positive refractive power, wherein the first lens group, the second lens group, the third lens group, the fourth lens group, and the fifth lens group are moved to change distances therebetween during magnification change, a distance between the first lens group and the second lens group at the telephoto end is larger than that at the wide-angle end, a distance between the second lens group and the third lens group at the telephoto end is larger than that at the wide-angle end, a distance between the third lens group and the fourth lens group at the telephoto end is smaller than that at the wide-angle end, and a distance between the fourth lens group and the fifth lens group at the telephoto end is smaller than that at the wide-angle end, positions of the first lens group, the second lens group, the fourth lens group, and the fifth lens group at the telephoto end are closer to the object side than their positions at the wide-angle end, the first lens group consists essentially of, in order from the object side, a negative meniscus lens with the concave surface toward the image side, a positive lens, and a positive lens, the second lens group consists essentially of, in order from the object side, a negative lens with the image-side surface having an absolute value of radius of curvature smaller than that of the object side surface thereof, a biconcave lens, and a biconvex lens, the third lens group consists essentially of a negative lens with the object side surface having an absolute value of radius of curvature smaller than that of the image-side surface thereof, and the third lens group is moved during focusing, the fifth lens group consists essentially of, in order from the object side, a fifth A lens group having a positive refractive power and consisting essentially of a biconvex lens, and a fifth B lens group having a negative refractive power and consisting essentially of, in order from the object side, a biconcave lens and a biconvex lens, and the condition expression (1) below is satisfied:

$$0.22 < fW/f1 < 0.27 \quad (1),$$

where fW is a focal length of the entire system at the wide-angle end, and f1 is a focal length of the first lens group.

It is more preferred that the condition expression (1-1) below be satisfied:

$$0.23 < fW/f1 < 0.26 \quad (1\text{-}1).$$

In the zoom lens of the invention, it is preferred that the condition expression (2) below be satisfied, and it is more preferred that the condition expression (2-1) below be satisfied:

$$-4 < f5/f5B < -0.7 \quad (2),$$

$$-4 < f5/f5B < -1 \quad (2\text{-}1),$$

where f5 is a focal length of the fifth lens group, and f5B is a focal length of the fifth B lens group.

It is preferred that the fourth lens group consist essentially of, in order from the object side, a fourth A lens group having a positive refractive power, and a fourth B lens group having a negative refractive power, and only the fourth B lens group be moved in directions perpendicular to an optical axis to effect image stabilization.

It is preferred that the fourth B lens group consist essentially of a positive lens and a negative lens.

It is preferred that the condition expression (3) below be satisfied, and it is more preferred that the condition expression (3-1) below be satisfied:

$$11.5 < vd4Bn - vd4Bp < 20 \quad (3),$$

$$12 < vd4Bn - vd4Bp < 18 \quad (3\text{-}1),$$

where vd4Bn is an Abbe number with respect to the d-line of the negative lens forming the fourth B lens group, and vd4Bp is an Abbe number with respect to the d-line of the positive lens forming the fourth B lens group.

It is preferred that the condition expression (4) below be satisfied, and it is more preferred that the condition expression (4-1) below be satisfied:

$$0.15 < Nd4Bp - Nd4Bn < 0.5 \quad (4),$$

$$0.15 < Nd4Bp - Nd4Bn < 0.4 \quad (4\text{-}1),$$

where Nd4Bp is a refractive index with respect to the d-line of the positive lens forming the fourth B lens group, and Nd4Bn is a refractive index with respect to the d-line of the negative lens forming the fourth B lens group.

It is preferred that the fourth B lens group consist essentially of, in order from the object side, a positive lens and a negative lens, the positive lens and the negative lens of the fourth B lens group be cemented together, and the cemented surface of the lenses cemented together be convex toward the image side and have the smallest absolute value of radius of curvature among the surfaces of the lenses forming the fourth B lens group.

It is preferred that the biconcave lens and the biconvex lens of the fifth B lens group be cemented together.

It is preferred that the condition expression (5) below be satisfied, and it is more preferred that the condition expression (5-1) below be satisfied:

$$-8 < f1/f23T < -5.5 \quad (5),$$

$$-6.4 < f1/f23T < -5.5 \quad (5\text{-}1),$$

where f1 is a focal length of the first lens group, and f23T is a combined focal length of the second lens group and the third lens group at the telephoto end.

It is preferred that the fourth A lens group consist essentially of, in order from the object side, a positive lens, and a positive lens and a negative lens which are cemented together.

It is preferred that the third lens group be moved toward the object side during focusing on a closer object.

It is preferred that the negative lens of the third lens group have aspheric surfaces on both sides thereof.

It is preferred that a sixth lens group having a positive refractive power be provided at the most image-side position.

The imaging apparatus of the invention comprises the above-described zoom lens of the invention.

It should be noted that the expression "consisting/consist essentially of" as used herein means that the zoom lens may include, besides the elements recited above: lenses substantially without any power; optical elements other than lenses, such as a stop, a mask, a cover glass, and filters; and mechanical components, such as a lens flange, a lens barrel, an image sensor, a camera shake correction mechanism, etc.

The sign (positive or negative) with respect to the surface shape and the refractive power of any lens including an aspheric surface described herein are about the paraxial region.

The zoom lens of the invention includes, consecutively in order from the object side, a first lens group having a positive refractive power, a second lens group having a negative refractive power, a third lens group having a negative refractive power, a fourth lens group having a positive refractive power, and a fifth lens group having a positive refractive power, wherein the first lens group, the second lens group, the third lens group, the fourth lens group, and the fifth lens group are moved to change distances therebetween during magnification change, a distance between the first lens group and the second lens group at the telephoto end is larger than that at the wide-angle end, a distance between the second lens group and the third lens group at the telephoto end is larger than that at the wide-angle end, a distance between the third lens group and the fourth lens group at the telephoto end is smaller than that at the wide-angle end, and a distance between the fourth lens group and the fifth lens group at the telephoto end is smaller than that at the wide-angle end, positions of the first lens group, the second lens group, the fourth lens group, and the fifth lens group at the telephoto end are closer to the object side than their positions at the wide-angle end, the first lens group consists essentially of, in order from the object side, a negative meniscus lens with the concave surface toward the image side, a positive lens, and a positive lens, the second lens group consists essentially of, in order from the object side, a negative lens with the image-side surface having an absolute value of radius of curvature smaller than that of the object side surface thereof, a biconcave lens, and a biconvex lens, the third lens group consists essentially of a negative lens with the object side surface having an absolute value of radius of curvature smaller than that of the image-side surface thereof, and the third lens group is moved during focusing, the fifth lens group consists essentially of, in order from the object side, a fifth A lens group having a positive refractive power and consisting essentially of a biconvex lens, and a fifth B lens group having a negative refractive power and consisting essentially of, in order from the object side, a biconcave lens and a biconvex lens, and the condition expression (1) below is satisfied:

$$0.22 < fW/f1 < 0.27 \quad (1).$$

This configuration allows providing a zoom lens having a high magnification and a short entire length.

The imaging apparatus of the invention, which is provided with the zoom lens of the invention, has a short entire length and is compact, and allows obtaining high magnification images.

BRIEF DESCRIPTION OF THE DRAWINGS

FIG. 3 is a sectional view illustrating the lens configuration of a zoom lens of Example 2 of the invention, FIG. 4 is a sectional view illustrating the lens configuration of a zoom lens of Example 3 of the invention, FIG. 5 is a sectional view illustrating the lens configuration of a zoom lens of Example 4 of the invention, FIG. 6 is a sectional view illustrating the lens configuration of a zoom lens of Example 5 of the invention, FIG. 9 shows aberration diagrams of the zoom lens of Example 3 of the invention, FIG. 10 shows aberration diagrams of the zoom lens of Example 4 of the invention, FIG. 11 shows aberration diagrams of the zoom lens of Example 5 of the invention.

DESCRIPTION OF THE PREFERRED EMBODIMENTS

Figure 1:
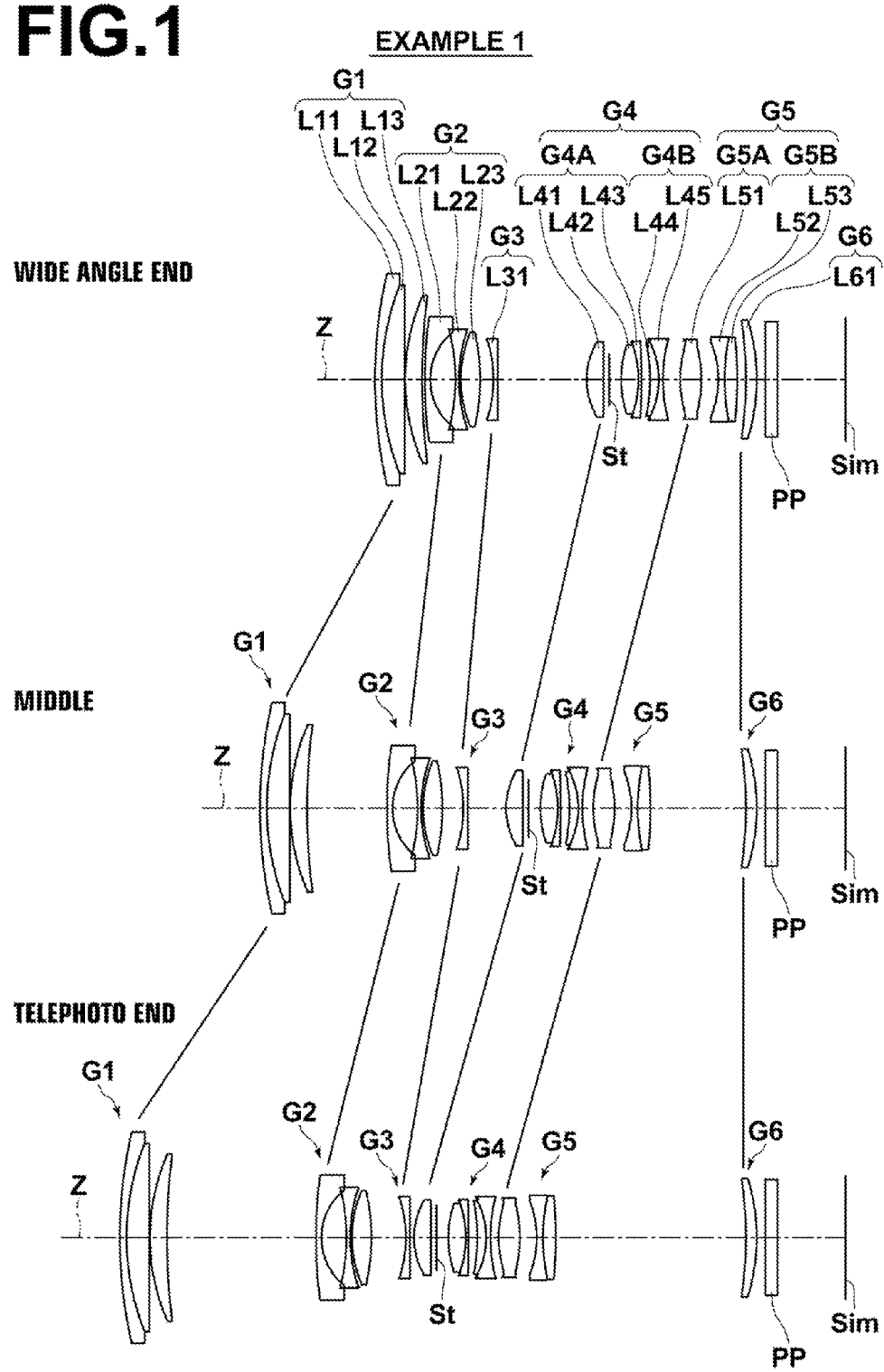
FIG. 1 is a sectional view illustrating the lens configuration of a zoom lens according to one embodiment of the invention (a zoom lens of Example 1)
Figure 2:
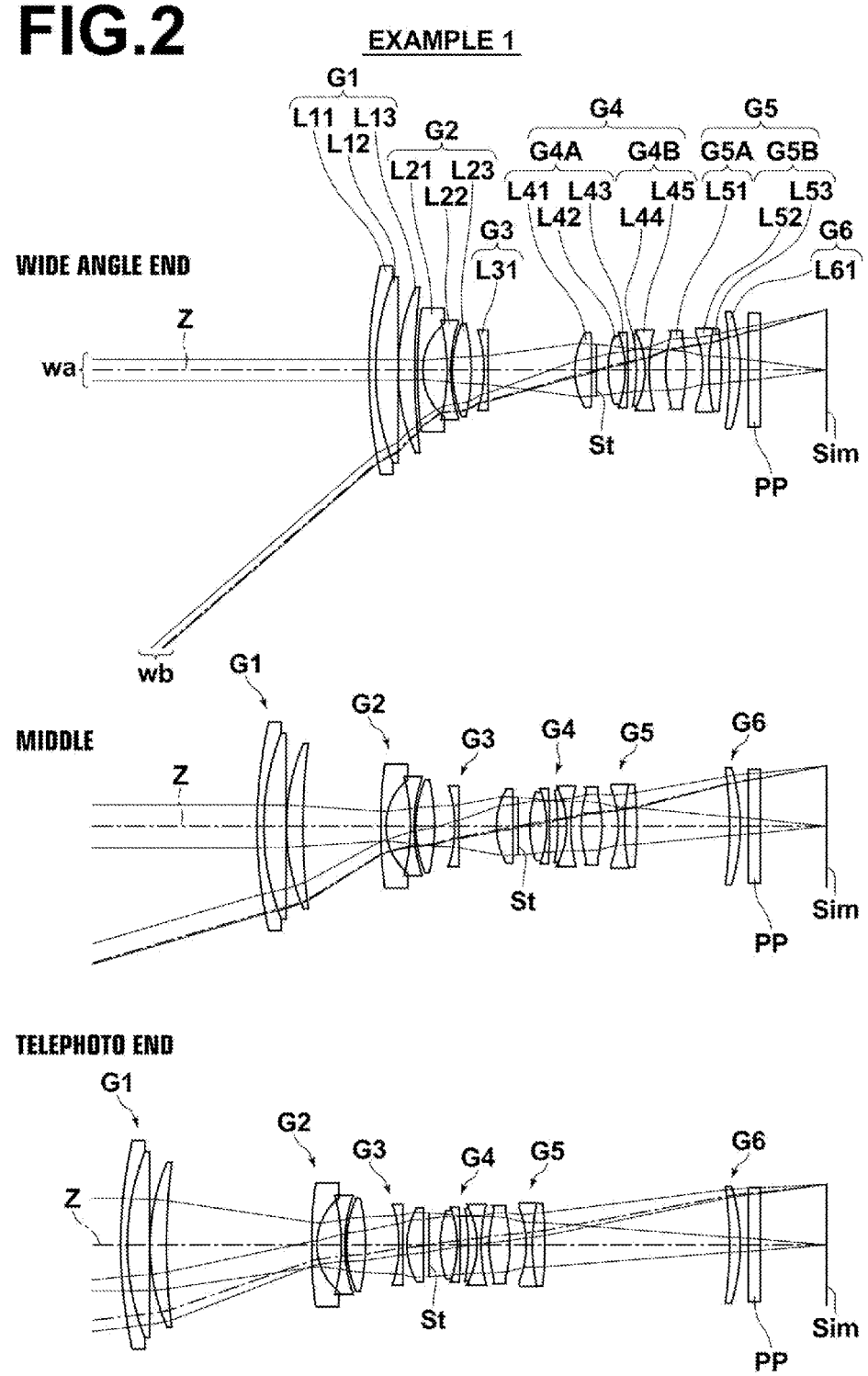
FIG. 2 is a diagram showing optical paths through the zoom lens according to one embodiment of the invention (the zoom lens of Example 1)

Hereinafter, embodiments of the present invention will be described in detail with reference to the drawings. FIG. 1 is a sectional view illustrating the lens configuration of a zoom lens according to one embodiment of the invention, and FIG. 2 is a diagram showing optical paths through the zoom lens. The configuration example shown in FIGS. 1 and 2 is the same as the configuration of a zoom lens of Example 1, which will be described later. In FIGS. 1 and 2, the left side is the object side and the right side is the image side. The aperture stop St shown in the drawings does not necessarily represent the size and the shape thereof, but represents the position thereof along the optical axis Z. FIG. 1 also shows movement loci of the individual lens groups. FIG. 2 also shows on-axis bundles of rays wa and bundles of rays wb at the maximum angle of view.

As shown in FIG. 1, this zoom lens includes, consecutively in order from the object side, a first lens group G1 having a positive refractive power, a second lens group G2 having a negative refractive power, a third lens group G3 having a negative refractive power, a fourth lens group G4 having a positive refractive power, and a fifth lens group G5 having a positive refractive power.

When this zoom lens is used with an imaging apparatus, it is preferred to provide a cover glass, a prism, various filters, such as an infrared cutoff filter and a low-pass filter, etc., between the optical system and an image plane Sim depending on the configuration of the camera on which the lens is mounted. In the example shown in FIGS. 1 and 2, an optical member PP in the form of a plane-parallel plate, which is assumed to represent such elements, is disposed between the lens system and the image plane Sim.

During magnification change of this zoom lens, the first lens group G1, the second lens group G2, the third lens group G3, the fourth lens group G4, and the fifth lens group G5 are moved to change the distances therebetween, where the distance between the first lens group G1 and the second lens group G2 at the telephoto end is larger than that at the wide-angle end, the distance between the second lens group G2 and the third lens group G3 at the telephoto end is larger than that at the wide-angle end, the distance between the third lens group G3 and the fourth lens group G4 at the telephoto end is smaller than that at the wide-angle end, the distance between the fourth lens group G4 and the fifth lens group G5 at the telephoto end is smaller than that at the wide-angle end, and positions of the first lens group G1, the second lens group G2, the fourth lens group G4, and the fifth lens group G5 at the telephoto end are closer to the object side than their positions at the wide-angle end.

The first lens group G1 consists of, in order from the object side, a negative meniscus lens L11 with the concave surface toward the image side, a positive lens L12, and a positive lens L13. Providing the two positive lenses in the first lens group G1 allows increasing the refractive power of the positive lenses as a whole while suppressing spherical aberration at the telephoto end, and the combination of the positive lenses and the negative lens allows preferably correcting for longitudinal chromatic aberration. It should be noted that providing four or more positive lenses in the first lens group G1 results in increase of the thickness of the first lens group G1 in the optical axis direction and the effective diameter of the first lens group G1, and therefore is not preferred. Forming the most object-side lens L11 by the negative meniscus lens with the concave surface toward the image side allows preventing overcorrection of lateral chromatic aberration at the peripheral area of the lens at the wide-angle side.

The second lens group G2 consists of, in order from the object side, a negative lens L21 with the image-side surface having an absolute value of radius of curvature smaller than that of the object side surface thereof, a biconcave lens L22, and a biconvex lens L23. The second lens group G2 mainly functions to effect magnification change. Providing the two negative lenses in the second lens group G2 allows effectively suppressing aberrations, in particular, spherical aberration and distortion, due to the negative lenses. Disposing the positive lens at the most image-side position is effective to correct for overcorrection of spherical aberration, which tends to occur at the telephoto side, and correct for longitudinal chromatic aberration.

The third lens group G3 consists of a negative lens L31 with the object side surface having an absolute value of radius of curvature smaller than that of the image-side surface thereof, and is configured to be moved during focusing. Forming the third lens group G3 by one lens allows making the third lens group G3, which is a focusing lens group, light weight, thereby speeding up focusing. The effect of speeding up focusing is expected regardless of the type of the AF (autofocus) system. In particular, in a case where wobbling is performed during contrast AF, a lighter weight focusing lens group is necessary and the light-weight third lens group G3 is expected to be highly effective.

The fifth lens group G5 consists of, in order from the object side, a fifth A lens group G5A having a positive refractive power and consisting of a biconvex lens L51, and a fifth B lens group G5B having a negative refractive power and consisting of, in order from the object side, a biconcave lens L52 and a biconvex lens L53. This configuration allows suppressing astigmatism and distortion while reducing the entire length.

Further, the fifth lens group G5 is configured to satisfy the condition expression (1) below. Satisfying the lower limit of the condition expression (1) is effective to reduce the entire length at the telephoto side. Satisfying the upper limit of the condition expression (1) facilitates increasing the zoom ratio. It should be noted that higher performance can be obtained when the condition expression (1-1) below is satisfied.

$$0.22 < fW/f1 < 0.27 \quad (1),$$

$$0.23 < fW/f1 < 0.26 \quad (1\text{-}1),$$

where fW is a focal length of the entire system at the wide-angle end, and f1 is a focal length of the first lens group.

In the zoom lens of the invention, it is preferred that the condition expression (2) below be satisfied. Satisfying the lower limit of the condition expression (2) allows suppressing distortion at the telephoto side. Satisfying the upper limit of the condition expression (2) is effective to reduce the entire length at the telephoto side. It should be noted that higher performance can be obtained when the condition expression (2-1) below is satisfied.

$$-4<f5/f5B<-0.7 \qquad (2),$$

$$-4<f5/f5B<-1 \qquad (2\text{-}1),$$

where f5 is a focal length of the fifth lens group, and f5B is a focal length of the fifth B lens group.

It is preferred that the fourth lens group G4 consist of, in order from the object side, a fourth A lens group G4A having a positive refractive power, and a fourth B lens group G4B having a negative refractive power, and image stabilization be effected by moving only the fourth B lens group G4B in directions perpendicular to the optical axis. This configuration facilitates effectively increasing sensitivity of the image stabilization while reducing the entire length.

It is preferred that the fourth B lens group G4B consist essentially of a positive lens L44 and a negative lens L45. This configuration allows suppressing change of astigmatism during image stabilization.

It is preferred that the condition expression (3) below be satisfied. Satisfying the lower limit of the condition expression (3) allows suppressing change of chromatic aberration during image stabilization. Satisfying the upper limit of the condition expression (3) allows suppressing undercorrection of longitudinal chromatic aberration. It should be noted that higher performance can be obtained when the condition expression (3-1) below is satisfied.

$$11.5<vd4Bn-vd4Bp<20 \qquad (3),$$

$$12<vd4Bn-vd4Bp<18 \qquad (3\text{-}1),$$

where vd4Bn is an Abbe number with respect to the d-line of the negative lens forming the fourth B lens group, and vd4Bp is an Abbe number with respect to the d-line of the positive lens forming the fourth B lens group.

It is preferred that the condition expression (4) below be satisfied. Satisfying the lower limit of the condition expression (4) allows suppressing change of astigmatism during image stabilization. Satisfying the upper limit of the condition expression (4) allows suppressing longitudinal chromatic aberration. It should be noted that higher performance can be obtained when the condition expression (4-1) below is satisfied.

$$0.15<Nd4Bp-Nd4Bn<0.5 \qquad (4),$$

$$0.15<Nd4Bp-Nd4Bn<0.4 \qquad (4\text{-}1),$$

where Nd4Bp is a refractive index with respect to the d-line of the positive lens forming the fourth B lens group, and Nd4Bn is a refractive index with respect to the d-line of the negative lens forming the fourth B lens group.

It is preferred that the fourth B lens group G4B consist essentially of, in order from the object side, a positive lens L44 and a negative lens L45, the positive lens L44 and the negative lens L45 be cemented together, and the cemented surface be convex toward the image side and have the smallest absolute value of radius of curvature among the surfaces of the lenses forming the fourth B lens group G4B.

Cementing the positive lens L44 and the negative lens L45 together is advantageous in suppressing higher-order aberrations and suppressing sensitivity to decentering between the lenses when compared to a case where the positive lens L44 and the negative lens L45 are separated lenses. When the cemented surface is convex toward the image side, the incidence angle of the principal ray at the peripheral angle of view on the cemented surface is small, and this allows suppressing astigmatism and suppressing change of astigmatism during image stabilization. This in turn allows a larger amount of correction for image stabilization. The cemented surface having the smallest absolute value of radius of curvature among the surfaces of the lenses forming the fourth B lens group G4B allows obtaining the effect of cementing the lenses in a pronounced manner.

It is preferred that the biconcave lens L52 and the biconvex lens L53 of the fifth B lens group be cemented together. This configuration is advantageous in suppressing higher-order aberrations, which would occur when the biconcave lens L52 and the biconvex lens L53 are separated lenses, and suppressing sensitivity to decentering between the lenses, while providing the biconcave lens L52 with a high negative refractive power.

It is preferred that the condition expression (5) below be satisfied. Satisfying the lower limit of the condition expression (5) allows suppressing distortion at the wide-angle end. Satisfying the upper limit of the condition expression (5) facilitates achieving a high magnification. It should be noted that higher performance can be obtained when the condition expression (5-1) below is satisfied.

$$-8<f1/f23T<-5.5 \qquad (5),$$

$$-6.4<f1/f23T<-5.5 \qquad (5\text{-}1),$$

where f1 is a focal length of the first lens group, and f23T is a combined focal length of the second lens group and the third lens group at the telephoto end.

It is preferred that the fourth A lens group G4A consist of, in order from the object side, a positive lens L41, and a positive lens L42 and a negative lens L43 which are cemented together. This configuration allows making the principal point closer to the third lens group G3, and this is advantageous in reducing the entire length, and achieving high magnification.

It is preferred that the third lens group G3 be moved toward the object side during focusing on a closer object. This configuration allows providing the second lens group G2 with a strong negative power, which is effective to reduce the entire length and allows reducing the diameter of the first lens group G1.

It is preferred that the negative lens L31 of the third lens group G3 have aspheric surfaces on both sides thereof. This configuration allows suppressing change of spherical aberration and astigmatism during focusing.

It is preferred that a sixth lens group G6 having a positive refractive power be provided at the most image-side position. This configuration facilitates suppressing the incidence angle on the image plane at the wide-angle end, and distortion and lateral chromatic aberration at the telephoto end.

As a material disposed on the most object side of the zoom lens, specifically, it is preferred to use glass, or a transparent ceramic may be used.

In a case where the zoom lens is used in a harsh environment, it is preferred that the zoom lens be provided with a protective multi-layer coating. Besides the protective coating, the zoom lens may be provided with an antireflection coating for reducing ghost light, etc., during use.

In the example shown in FIGS. 1 and 2, the optical member PP is disposed between the lens system and the image plane Sim. However, in place of disposing the various filters, such as a low-pass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the zoom lens of the invention are described.

First, a zoom lens of Example 1 is described. FIG. 1 is a sectional view illustrating the lens configuration of the zoom lens of Example 1. It should be noted that, in FIG. 1 and FIGS. 3 to 6 corresponding to Examples 2 to 5, which will be described later, the left side is the object side and the right side is the image side. The aperture stop St shown in the drawings does not necessarily represent the size and the shape thereof, but represents the position thereof along the optical axis Z.

The zoom lens of Example 1 has a six-group configuration including first to sixth lens groups G1 to G6 in this order from the object side. Table 1 shows basic lens data of the zoom lens of Example 1, Table 2 shows data about specifications of the zoom lens, Table 3 shows data about distances between surfaces to be moved of the zoom lens, and Table 4 shows data about aspheric coefficients of the zoom lens. In the following description, meanings of symbols used in the tables are explained with respect to Example 1 as an example. The same explanations basically apply to those with respect to Examples 2 to 5.

In the lens data shown in Table 1, each value in the column of "Surface No." represents each surface number, where the object-side surface of the most object-side element is the 1st surface and the number is sequentially increased toward the image side, each value in the column of "Radius of Curvature" represents the radius of curvature of each surface, and each value in the column of "Surface Distance" represents the distance along the optical axis Z between each surface and the next surface. Each value in the column of "nd" represents the refractive index with respect to the d-line (the wavelength of 587.6 nm) of each optical element, and each value in the column of "vd" represents the Abbe number with respect to the d-line (the wavelength of 587.6 nm) of each optical element.

The sign with respect to the radius of curvature is provided such that a positive radius of curvature indicates a surface shape that is convex toward the object side, and a negative radius of curvature indicates a surface shape that is convex toward the image side. The basic lens data also includes data of the aperture stop St and the optical member PP, and the surface number and the text "(stop)" are shown at the position in the column of the surface number corresponding to the aperture stop St. In the lens data shown in Table 1, the value of each surface distance that is changed during magnification change is represented by the symbol "DD[surface number]". The numerical value corresponding to each DD[surface number] is shown in Table 3.

The data about specifications shown in Table 2 show values of zoom magnification, focal length f', back focus Bf', f-number FNo., and total angle of view 2ω.

With respect to the basic lens data, the data about specifications, and the data about distances between surfaces to be moved, the unit of angle is degrees, and the unit of length is millimeters; however, any other suitable units may be used since optical systems are usable when they are proportionally enlarged or reduced.

In the lens data shown in Table 1, the symbol "*" is added to the surface number of each aspheric surface, and a numerical value of the paraxial radius of curvature is shown as the radius of curvature of each aspheric surface. In the data about aspheric coefficients shown in Table 4, the surface number of each aspheric surface and aspheric coefficients about each aspheric surface are shown. The aspheric coefficients are values of the coefficients KA and Am (where m=3, 20) in the formula of aspheric surface shown below:

$$Zd = C \cdot h^2 / \{1 + (1 - KA \cdot C^2 \cdot h^2)^{1/2}\} + \Sigma Am \cdot h^m,$$

where Zd is a depth of the aspheric surface (a length of a perpendicular line from a point with a height h on the aspheric surface to a plane tangent to the apex of the aspheric surface and perpendicular to the optical axis), h is the height (a distance from the optical axis), C is a reciprocal of the paraxial radius of curvature, and KA and Am are aspheric coefficients (where m=3, . . . , 20).

TABLE 1

Example 1- Lens Data

| Surface No. | Radius of Curvature | Surface Distance | nd | vd |
|---|---|---|---|---|
| 1 | 115.12193 | 1.610 | 1.92286 | 20.88 |
| 2 | 61.95000 | 5.400 | 1.59282 | 68.63 |
| 3 | ∞ | 0.100 | | |
| 4 | 50.33009 | 4.000 | 1.75500 | 52.32 |
| 5 | 160.32074 | DD[5] | | |
| *6 | 870.65893 | 1.250 | 1.85135 | 40.23 |
| *7 | 16.61875 | 5.892 | | |
| 8 | −47.83544 | 0.850 | 1.83481 | 42.73 |
| 9 | 36.22386 | 0.440 | | |
| 10 | 28.76033 | 4.580 | 1.92286 | 20.88 |
| 11 | −49.28002 | DD[11] | | |
| *12 | −36.68885 | 1.000 | 1.79839 | 45.28 |
| *13 | 199.99995 | DD[13] | | |
| *14 | 17.31958 | 4.000 | 1.56867 | 58.50 |
| *15 | −1504.88688 | 1.300 | | |
| 16 (stop) | ∞ | 2.800 | | |
| 17 | 25.70600 | 4.100 | 1.49700 | 81.54 |
| 18 | −25.70600 | 0.700 | 1.92286 | 20.88 |
| 19 | −186.46145 | 2.000 | | |
| 20 | −46.12744 | 2.110 | 2.00069 | 25.46 |
| 21 | −19.96500 | 1.000 | 1.67300 | 38.15 |
| 22 | 38.85149 | DD[22] | | |
| *23 | 24.81745 | 5.000 | 1.66630 | 55.16 |
| *24 | −31.50917 | 4.000 | | |
| 25 | −24.21079 | 1.510 | 1.88300 | 40.76 |
| 26 | 50.39700 | 2.990 | 1.72825 | 28.46 |
| 27 | −96.38585 | DD[27] | | |
| 28 | −99.96628 | 2.570 | 1.48749 | 70.23 |
| 29 | −48.81415 | 2.000 | | |
| 30 | ∞ | 2.850 | 1.51680 | 64.20 |
| 31 | ∞ | 16.080 | | |

TABLE 2

Example 1 - Specifications (d-line)

| | Wide Angle | Middle | Telephoto |
|---|---|---|---|
| Zoom Magnification | 1.0 | 2.7 | 7.1 |
| f' | 18.50 | 49.19 | 130.78 |
| Bf' | 19.96 | 19.96 | 19.96 |
| FNo. | 3.61 | 4.73 | 5.81 |
| 2ω[°] | 81.6 | 32.6 | 12.6 |

TABLE 3

Example 1 - Distances with respect to Zoom

| | Wide Angle | Middle | Telephoto |
|---|---|---|---|
| DD[5] | 0.698 | 18.892 | 35.203 |
| DD[11] | 3.091 | 4.902 | 8.085 |
| DD[13] | 20.999 | 9.091 | 0.956 |
| DD[22] | 4.000 | 2.524 | 1.922 |
| DD[27] | 2.000 | 22.476 | 44.781 |

TABLE 4

Example 1 - Aspheric Coefficients

| Surface No. | 6 | 7 | 12 |
|---|---|---|---|
| KA | 1.0000000E+00 | 1.0000000E+00 | 1.0000000E+00 |
| A3 | −3.3258659E−05 | −1.3257457E−06 | −2.5716568E−04 |
| A4 | 1.0879994E−04 | 1.0274592E−04 | −3.1477418E−05 |
| A5 | −4.7885502E−06 | −3.8403367E−06 | −5.8230201E−07 |
| A6 | −1.0759633E−06 | 4.2461037E−09 | 1.3471177E−06 |
| A7 | 6.1277394E−08 | −1.0911228E−07 | −6.6131579E−08 |
| A8 | 4.4147811E−09 | 3.6932216E−09 | −1.1914342E−09 |
| A9 | −3.4318863E−11 | 9.9033512E−10 | −2.4884705E−09 |
| A10 | −1.6729044E−11 | −1.4923235E−11 | 2.7859801E−10 |
| A11 | −9.9458644E−13 | 7.5628602E−12 | 9.3821157E−12 |
| A12 | 3.6090358E−15 | −1.1009805E−12 | 4.7688895E−13 |
| A13 | 2.0883127E−15 | −4.1239435E−14 | −3.7218163E−14 |
| A14 | 2.1746094E−16 | 2.3398595E−15 | −1.5438437E−14 |
| A15 | 1.1722253E−17 | 4.1733591E−16 | −2.1576117E−15 |
| A16 | 1.5033988E−19 | 2.2479475E−17 | −2.3652804E−16 |
| A17 | −4.0529382E−20 | −8.7519908E−19 | −2.0527067E−17 |
| A18 | −4.5240895E−21 | −3.2736360E−19 | 6.8754879E−18 |
| A19 | −1.9098322E−22 | −3.0000033E−20 | 1.2534597E−18 |
| A20 | 2.1242397E−23 | 3.6292592E−21 | −1.3017061E−19 |

| Surface No | 13 | 14 | 15 |
|---|---|---|---|
| KA | 1.0000000E+00 | 1.0000000E+00 | 1.0000000E+00 |
| A3 | −2.4949403E−04 | −2.5260169E−05 | −3.2153387E−05 |
| A4 | −3.5725409E−05 | 7.5611598E−06 | 3.5024607E−05 |
| A5 | 2.1839917E−06 | −8.8679250E−06 | −1.4415764E−05 |
| A6 | 4.3156603E−07 | 1.3986681E−06 | 2.0048636E−06 |
| A7 | 4.6890150E−08 | −3.8239999E−08 | 8.5395147E−08 |
| A8 | −2.7142956E−09 | −6.2990664E−09 | −2.7593537E−08 |
| A9 | −1.3765897E−09 | −1.6339604E−11 | −1.5824477E−09 |
| A10 | −1.1766821E−10 | 3.5819503E−11 | 9.7508883E−11 |
| A11 | 9.5832042E−12 | −8.8035859E−12 | 2.7671017E−11 |
| A12 | 2.4935568E−12 | −5.7183112E−13 | 3.2754768E−12 |
| A13 | 2.8498926E−13 | 8.6147165E−14 | 4.6387406E−14 |
| A14 | 8.7246413E−15 | 3.2149749E−14 | −3.6779862E−14 |
| A15 | 6.5806925E−16 | 3.9749647E−15 | −6.2819774E−15 |
| A16 | −2.7329827E−16 | −1.5337120E−16 | −5.7196441E−16 |
| A17 | −1.7352286E−16 | −1.4810442E−16 | −2.6177942E−17 |
| A18 | −6.9614104E−17 | −3.1323886E−17 | 9.2927985E−18 |
| A19 | 1.7448607E−17 | 7.9878135E−18 | 4.4727344E−18 |
| A20 | −9.1035356E−19 | −4.0881988E−19 | −4.2439516E−19 |

| Surface No. | 23 | 24 |
|---|---|---|
| KA | 1.0000000E+00 | 1.0000000E+00 |
| A3 | −3.5430903E−05 | −3.8587863E−05 |
| A4 | −3.0748443E−06 | 3.4605942E−05 |
| A5 | −7.9498260E−06 | −2.2352878E−06 |
| A6 | 5.3530373E−07 | −1.5966209E−07 |
| A7 | 9.9676262E−08 | 2.7115440E−08 |
| A8 | −6.5293589E−09 | 3.9965050E−09 |
| A9 | −1.1113069E−09 | −1.1028928E−09 |
| A10 | −2.8251173E−10 | 1.3092306E−10 |
| A11 | 1.2613768E−11 | −4.5416954E−12 |
| A12 | 4.5611890E−12 | −1.9602695E−12 |
| A13 | 4.4996069E−13 | −1.1855210E−13 |
| A14 | 1.7771658E−15 | 1.2366695E−14 |
| A15 | −4.9618221E−15 | 3.9780095E−15 |
| A16 | −8.9926075E−16 | 2.7200359E−16 |
| A17 | −2.2844918E−16 | −1.6159957E−17 |
| A18 | −3.1031128E−17 | −1.8700513E−18 |
| A19 | 1.6555816E−17 | −1.5981389E−18 |
| A20 | −1.0768819E−18 | 1.4631615E−19 |

Figure 7:
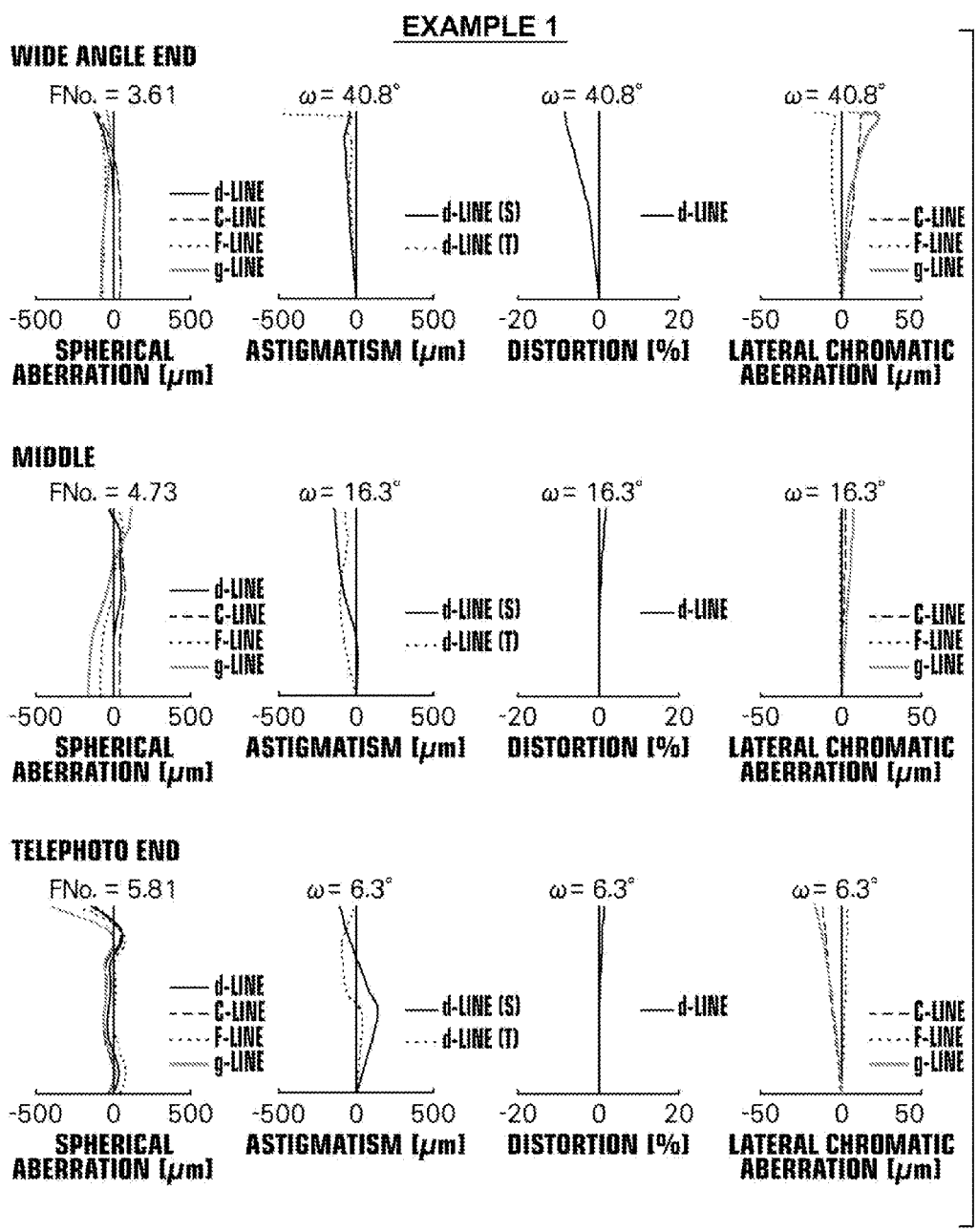
FIG. 7 shows aberration diagrams of the zoom lens of Example 1 of the invention.

FIG. 7 shows aberration diagrams of the zoom lens of Example 1. The aberration diagrams shown at the top of FIG. 7 are those of spherical aberration, astigmatism, distortion, and lateral chromatic aberration at the wide-angle end in this order from the left side, the aberration diagrams shown at the middle of FIG. 7 are those of spherical aberration, astigmatism, distortion, and lateral chromatic aberration at the middle position in this order from the left side, and the aberration diagrams shown at the bottom of FIG. 7 are those of spherical aberration, astigmatism, distortion, and lateral chromatic aberration at the telephoto end in this order from the left side. The aberration diagrams of spherical aberration, astigmatism, and distortion show those with respect to the d-line (the wavelength of 587.6 nm), which is used as a reference wavelength. The aberration diagrams of spherical aberration show those with respect to the d-line (the wavelength of 587.6 nm), the C-line (the wavelength of 656.3 nm), the F-line (the wavelength of 486.1 nm), and the g-line (the wavelength of 435.8 nm) in the solid line, the long dashed line, the short dashed line, and the dotted line, respectively. The aberration diagrams of astigmatism show those in the sagittal direction and the tangential direction in the solid line, and the short dashed line, respectively. The aberration diagrams of lateral chromatic aberration show those with respect to the C-line (the wavelength of 656.3 nm) the F-line (the wavelength of 486.1 nm), and the g-line (the wavelength of 435.8 nm) in the long dashed line, the short dashed line, and the dotted line, respectively. The "FNo." in the aberration diagrams of spherical aberration means "f-number", and the "ω" in the other aberration diagrams means "half angle of view".

Figure 8:
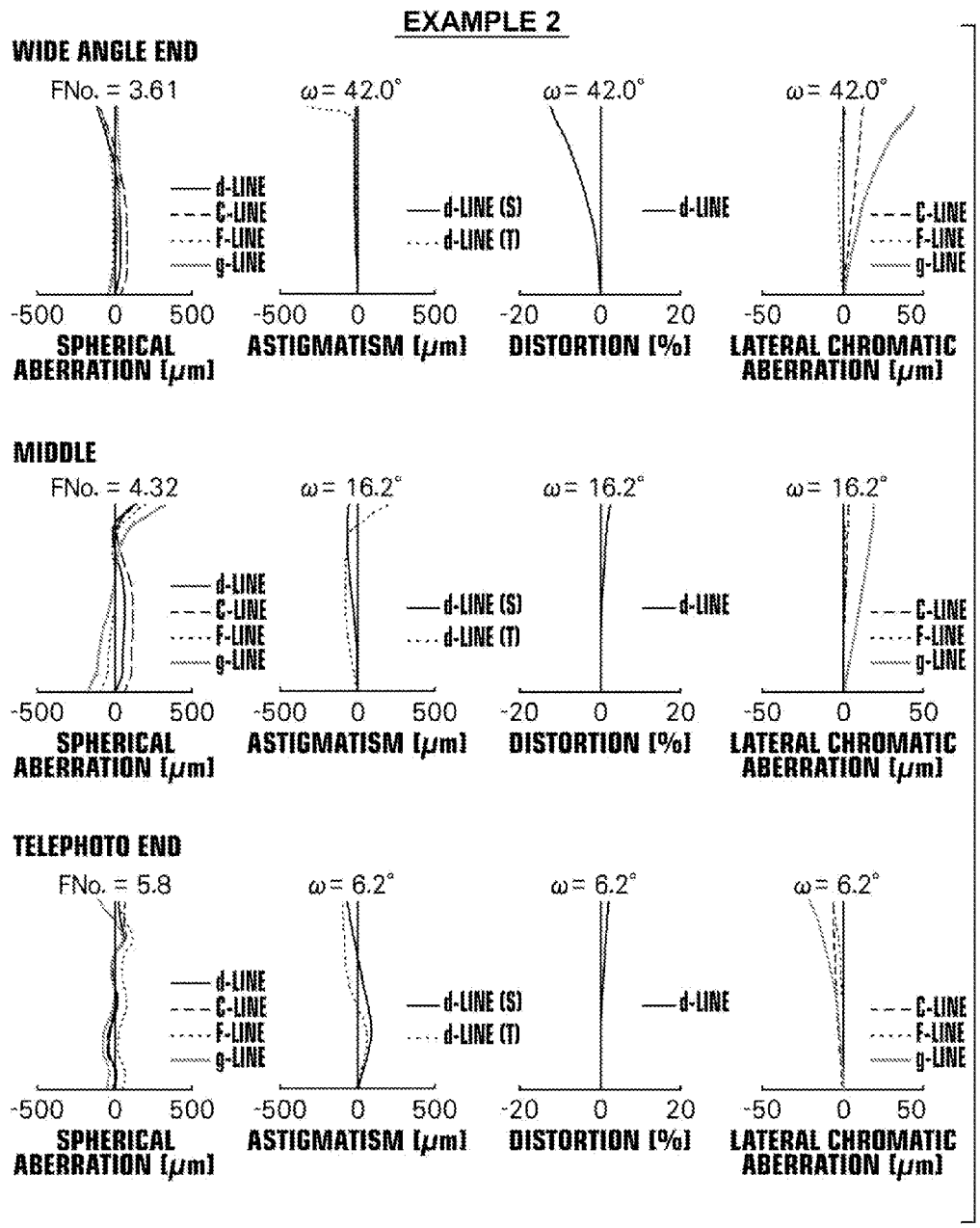
FIG. 8 shows aberration diagrams of the zoom lens of Example 2 of the invention.

Next, a zoom lens of Example 2 is described. The zoom lens of Example 2 has a six-group configuration including first to sixth lens groups G1 to G6 in this order from the object side. FIG. 3 is a sectional view illustrating the lens configuration of the zoom lens of Example 2. Table 5 shows basic lens data of the zoom lens of Example 2, Table 6 shows data about specifications of the zoom lens, Table 7 shows data about distances between surfaces to be moved of the zoom lens, Table 8 shows data about aspheric coefficients of the zoom lens, and FIG. 8 shows aberration diagrams of the zoom lens.

TABLE 5

Example 2- Lens Data

| Surface No. | Radius of Curvature | Surface Distance | nd | vd |
|---|---|---|---|---|
| 1 | 120.00002 | 1.610 | 1.84666 | 23.78 |
| 2 | 55.50645 | 6.499 | 1.49700 | 81.54 |
| 3 | −492.96065 | 0.100 | | |
| 4 | 47.00000 | 4.568 | 1.72916 | 54.68 |
| 5 | 176.23655 | DD[5] | | |
| *6 | 216.47589 | 1.250 | 1.85135 | 40.10 |
| *7 | 14.98458 | 5.831 | | |
| 8 | −51.65963 | 0.850 | 1.88300 | 40.76 |
| 9 | 47.07048 | 0.134 | | |
| 10 | 28.62671 | 4.350 | 1.92286 | 18.90 |
| 11 | −56.25942 | DD[11] | | |
| *12 | −27.93461 | 1.000 | 1.76802 | 49.24 |
| *13 | −1083.83529 | DD[13] | | |
| *14 | 22.12463 | 3.201 | 1.58313 | 59.38 |
| *15 | −149.16912 | 1.300 | | |
| 16 (stop) | ∞ | 2.800 | | |
| 17 | 26.77790 | 4.710 | 1.49700 | 81.54 |
| 18 | −17.22710 | 0.700 | 1.92286 | 20.88 |
| 19 | −53.27851 | 2.000 | | |
| 20 | −38.10691 | 2.610 | 2.00069 | 25.46 |
| 21 | −17.43044 | 0.800 | 1.67300 | 38.15 |
| 22 | 45.26521 | DD[22] | | |
| *23 | 23.37267 | 4.200 | 1.80139 | 45.45 |
| *24 | −30.09455 | 4.500 | | |
| 25 | −18.16139 | 0.810 | 1.88300 | 40.76 |
| 26 | 18.11663 | 4.300 | 1.59551 | 39.24 |
| 27 | −52.12642 | DD[27] | | |
| 28 | −256.05947 | 2.558 | 1.48749 | 70.23 |
| 29 | −64.10153 | 2.000 | | |
| 30 | ∞ | 2.850 | 1.51680 | 64.20 |
| 31 | ∞ | 14.973 | | |

TABLE 6

Example 2 - Specifications (d-line)

|  | Wide Angle | Middle | Telephoto |
|---|---|---|---|
| Zoom Magnification | 1.0 | 2.7 | 7.1 |
| f | 18.55 | 49.32 | 131.14 |
| Bf | 18.85 | 18.85 | 18.85 |
| FNo. | 3.61 | 4.32 | 5.78 |
| 2ω[°] | 84.0 | 32.4 | 12.4 |

TABLE 7

Example 2 - Distances with respect to Zoom

|  | Wide Angle | Middle | Telephoto |
|---|---|---|---|
| DD[5] | 0.514 | 19.163 | 35.437 |
| DD[11] | 3.547 | 4.733 | 8.541 |
| DD[13] | 19.303 | 8.851 | 1.165 |
| DD[22] | 4.801 | 2.414 | 1.428 |
| DD[27] | 2.000 | 21.004 | 41.006 |

TABLE 8

Example 2 - Aspheric Coefficients

| Surface No. | 6 | 7 | 12 |
|---|---|---|---|
| KA | 1.0000000E+00 | 1.0000000E+00 | 1.0000000E+00 |
| A3 | 1.1221878E-05 | 3.7568241E-05 | -5.5719315E-05 |
| A4 | 1.3518372E-05 | -4.4783144E-06 | 3.3041383E-06 |
| A5 | -1.2273453E-07 | 5.5015163E-06 | -1.4374868E-06 |
| A6 | -1.2800345E-07 | -4.9023726E-07 | 7.6958093E-07 |
| A7 | -1.0009400E-09 | -9.8307190E-08 | -9.1181808E-08 |
| A8 | 4.5382821E-10 | 1.6472442E-08 | 6.9208730E-09 |
| A9 | 2.0141215E-11 | 1.3565016E-10 | -1.7979319E-09 |
| A10 | -9.1055557E-13 | -1.5258483E-10 | 2.1138684E-10 |
| A11 | -1.2779444E-13 | 6.9768228E-12 | -4.1130670E-12 |
| A12 | 5.5850786E-15 | 5.9930734E-15 | -2.3717264E-13 |
| A13 | 0.0000000E+00 | 0.0000000E+00 | -2.0414357E-14 |
| A14 | 0.0000000E+00 | 0.0000000E+00 | 1.2195098E-15 |
| A15 | 0.0000000E+00 | 0.0000000E+00 | 9.9975217E-16 |
| A16 | 0.0000000E+00 | 0.0000000E+00 | -6.3135314E-17 |
| A17 | 0.0000000E+00 | 0.0000000E+00 | -6.3543114E-17 |
| A18 | 0.0000000E+00 | 0.0000000E+00 | -6.3833114E-18 |
| A19 | 0.0000000E+00 | 0.0000000E+00 | 3.4262424E-18 |
| A20 | 0.0000000E+00 | 0.0000000E+00 | -2.2411782E-19 |

| Surface No. | 13 | 14 | 15 |
|---|---|---|---|
| KA | 1.0000000E+00 | 1.0000000E+00 | 1.0000000E+00 |
| A3 | -7.3813707E-05 | -5.4463913E-05 | -3.1093764E-05 |
| A4 | -1.8557239E-06 | 2.7217724E-06 | 2.5582496E-05 |
| A5 | 3.0485097E-06 | -9.0279105E-06 | -7.5657948E-06 |
| A6 | -2.3394960E-07 | 1.0062285E-06 | 7.9789024E-07 |
| A7 | -3.1759756E-08 | 4.7122689E-09 | 3.8916177E-08 |
| A8 | 1.6793133E-09 | -5.2459222E-09 | -9.8723131E-09 |
| A9 | 4.7871035E-10 | -2.3321974E-10 | 5.5172398E-11 |
| A10 | 3.0410608E-11 | 3.5263815E-11 | 3.0554144E-11 |
| A11 | -1.7053609E-12 | 0.0000000E+00 | 0.0000000E+00 |
| A12 | -5.6872868E-13 | 0.0000000E+00 | 0.0000000E+00 |
| A13 | -9.0627972E-14 | 0.0000000E+00 | 0.0000000E+00 |
| A14 | -5.8954125E-15 | 0.0000000E+00 | 0.0000000E+00 |
| A15 | 1.1154256E-15 | 0.0000000E+00 | 0.0000000E+00 |
| A16 | 2.5026738E-16 | 0.0000000E+00 | 0.0000000E+00 |
| A17 | -2.2331601E-17 | 0.0000000E+00 | 0.0000000E+00 |
| A18 | -3.5089968E-17 | 0.0000000E+00 | 0.0000000E+00 |
| A19 | 8.4394724E-18 | 0.0000000E+00 | 0.0000000E+00 |
| A20 | -5.0650710E-19 | 0.0000000E+00 | 0.0000000E+00 |

TABLE 8-continued

Example 2 - Aspheric Coefficients

| Surface No. | 23 | 24 |
|---|---|---|
| KA | 1.0000000E+00 | 1.0000000E+00 |
| A3 | 7.7671945E-07 | 4.0260463E-06 |
| A4 | -3.7879275E-06 | 1.6507691E-05 |
| A5 | -1.7658918E-06 | 6.2408936E-07 |
| A6 | 4.2726838E-07 | -1.6406306E-07 |
| A7 | 1.1336356E-08 | 2.9527378E-08 |
| A8 | -7.8090506E-09 | 4.7984191E-09 |
| A9 | 6.3169336E-10 | -1.2461169E-09 |
| A10 | -1.3046310E-11 | 6.5903341E-11 |
| A11 | 0.0000000E+00 | 0.0000000E+00 |
| A12 | 0.0000000E+00 | 0.0000000E+00 |
| A13 | 0.0000000E+00 | 0.0000000E+00 |
| A14 | 0.0000000E+00 | 0.0000000E+00 |
| A15 | 0.0000000E+00 | 0.0000000E+00 |
| A16 | 0.0000000E+00 | 0.0000000E+00 |
| A17 | 0.0000000E+00 | 0.0000000E+00 |
| A18 | 0.0000000E+00 | 0.0000000E+00 |
| A19 | 0.0000000E+00 | 0.0000000E+00 |
| A20 | 0.0000000E+00 | 0.0000000E+00 |

Next, a zoom lens of Example 3 is described. The zoom lens of Example 3 has a six-group configuration including first to sixth lens groups G1 to G6 in this order from the object side. FIG. 4 is a sectional view illustrating the lens configuration of the zoom lens of Example 3. Table 9 shows basic lens data of the zoom lens of Example 3, Table 10 shows data about specifications of the zoom lens, Table 11 shows data about distances between surfaces to be moved of the zoom lens, Table 12 shows data about aspheric coefficients of the zoom lens, and FIG. 9 shows aberration diagrams of the zoom lens.

TABLE 9

Example 3 - Lens Data

| Surface No. | Radius of Curvature | Surface Distance | nd | vd |
|---|---|---|---|---|
| 1 | 88.79754 | 1.610 | 1.92286 | 18.90 |
| 2 | 54.96869 | 5.744 | 1.59282 | 68.63 |
| 3 | 643.36526 | 0.100 |  |  |
| 4 | 47.32835 | 4.136 | 1.72916 | 54.68 |
| 5 | 139.85119 | DD[5] |  |  |
| 6 | 95.44392 | 1.100 | 1.88300 | 40.76 |
| 7 | 14.50000 | 0.200 | 1.51876 | 54.04 |
| *8 | 13.58650 | 6.610 |  |  |
| 9 | -47.23446 | 0.850 | 1.88300 | 40.76 |
| 10 | 56.99527 | 0.100 |  |  |
| 11 | 30.13973 | 4.400 | 1.92286 | 18.90 |
| 12 | -51.44994 | DD[12] |  |  |
| *13 | -27.74023 | 1.000 | 1.80139 | 45.45 |
| *14 | 478.12059 | DD[14] |  |  |
| *15 | 22.91300 | 3.097 | 1.58913 | 61.15 |
| *16 | -154.55358 | 1.300 |  |  |
| 17 (stop) | ∞ | 2.800 |  |  |
| 18 | 27.32893 | 5.010 | 1.49700 | 81.54 |
| 19 | -15.90601 | 0.700 | 1.92286 | 20.88 |
| 20 | -39.69395 | 1.500 |  |  |
| 21 | -38.39170 | 3.010 | 1.92119 | 23.96 |
| 22 | -16.67513 | 0.800 | 1.65412 | 39.68 |
| 23 | 45.84840 | DD[23] |  |  |
| *24 | 25.00941 | 4.200 | 1.77250 | 49.47 |
| *25 | -27.74587 | 4.468 |  |  |
| 26 | -17.82788 | 0.810 | 1.83481 | 42.73 |
| 27 | 20.00000 | 4.031 | 1.54814 | 45.79 |
| 28 | -51.14899 | DD[28] |  |  |
| 29 | -4009.52707 | 2.636 | 1.48749 | 70.23 |
| 30 | -82.12123 | 3.000 |  |  |
| 31 | ∞ | 2.850 | 1.51680 | 64.20 |
| 32 | ∞ | 14.718 |  |  |

TABLE 10

Example 3 - Specifications (d-line)

|  | Wide Angle | Middle | Telephoto |
|---|---|---|---|
| Zoom Magnification | 1.0 | 2.7 | 7.1 |
| f | 18.61 | 49.48 | 131.56 |
| Bf | 19.60 | 19.60 | 19.60 |
| FNo. | 3.65 | 4.34 | 5.78 |
| 2ω[°] | 80.8 | 32.2 | 12.4 |

TABLE 11

Example 3 - Distances with respect to Zoom

|  | Wide Angle | Middle | Telephoto |
|---|---|---|---|
| DD[5] | 0.514 | 18.449 | 33.673 |
| DD[12] | 3.314 | 4.497 | 7.416 |
| DD[14] | 17.782 | 8.172 | 1.117 |
| DD[23] | 4.839 | 2.364 | 1.405 |
| DD[28] | 2.000 | 21.446 | 41.711 |

TABLE 12

Example 3 - Aspheric Coefficients

| | Surface No. | | |
|---|---|---|---|
| | 8 | 13 | 14 |
| KA | 1.0000000E+00 | 1.0000000E+00 | 1.0000000E+00 |
| A3 | 5.8487396E−06 | −1.5147001E−04 | −1.6613155E−04 |
| A4 | −1.5115674E−05 | −1.8164847E−05 | −1.5411807E−05 |
| A5 | 1.7438429E−06 | −2.2479702E−06 | −7.1705500E−07 |
| A6 | −1.1341123E−07 | 5.4850426E−07 | 9.9605595E−08 |
| A7 | −3.8782727E−08 | 3.5219496E−08 | 4.8798261E−08 |
| A8 | 3.5567798E−09 | −3.5368958E−09 | 1.9769896E−09 |
| A9 | 2.5849753E−10 | −4.9370176E−10 | −5.8162837E−10 |
| A10 | −3.1166865E−11 | −1.5467949E−11 | −5.8758678E−11 |
| A11 | −3.8746775E−13 | 1.6093561E−12 | −8.2187999E−13 |
| A12 | 5.0736515E−14 | 3.7927204E−13 | 1.2294185E−12 |
| A13 | 0.0000000E+00 | 2.5917651E−14 | −2.9540673E−14 |
| A14 | 0.0000000E+00 | −3.2287953E−15 | −5.1995406E−14 |
| A15 | 0.0000000E+00 | 6.4945764E−16 | 1.1508454E−14 |
| A16 | 0.0000000E+00 | −7.9730362E−17 | −6.8869553E−16 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

| | Surface No. | | |
|---|---|---|---|
| | 15 | 16 | 24 |
| KA | 1.0000000E+00 | 1.0000000E+00 | 1.0000000E+00 |
| A3 | −3.6500580E−05 | −1.3203490E−05 | 9.0482562E−06 |
| A4 | 1.2006343E−05 | 1.0963961E−05 | −9.3317689E−06 |
| A5 | −3.3912355E−06 | −2.1759789E−06 | 2.6904039E−08 |
| A6 | 2.2635353E−07 | 1.8496919E−07 | 2.0406814E−07 |
| A7 | 2.2183467E−08 | 1.8740856E−08 | 3.7332270E−09 |
| A8 | −6.6661665E−10 | −1.8437431E−10 | −3.0080183E−09 |
| A9 | −4.9108293E−10 | −2.8736728E−10 | 6.9438274E−12 |
| A10 | 2.9108364E−11 | 2.1003029E−11 | 1.9773408E−11 |
| A11 | 0.0000000E+00 | 0.0000000E+00 | 0.0000000E+00 |
| A12 | 0.0000000E+00 | 0.0000000E+00 | 0.0000000E+00 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

TABLE 12-continued

Example 3 - Aspheric Coefficients

| | Surface No. |
|---|---|
| | 25 |
| KA | 1.0000000E+00 |
| A3 | 1.2416281E−05 |
| A4 | 1.1936992E−05 |
| A5 | 7.4522501E−07 |
| A6 | 3.3495116E−08 |
| A7 | 1.1405804E−08 |
| A8 | −7.8090925E−10 |
| A9 | −3.6372656E−10 |
| A10 | 3.5441206E−11 |
| A11 | 0.0000000E+00 |
| A12 | 0.0000000E+00 |
| A13 | 0.0000000E+00 |
| A14 | 0.0000000E+00 |
| A15 | 0.0000000E+00 |
| A16 | 0.0000000E+00 |
| A17 | 0.0000000E+00 |
| A18 | 0.0000000E+00 |
| A19 | 0.0000000E+00 |
| A20 | 0.0000000E+00 |

Next, a zoom lens of Example 4 is described. The zoom lens of Example 4 has a six-group configuration including first to sixth lens groups G1 to G6 in this order from the object side. FIG. 5 is a sectional view illustrating the lens configuration of the zoom lens of Example 4. Table 13 shows basic lens data of the zoom lens of Example 4, Table 14 shows data about specifications of the zoom lens, Table 15 shows data about distances between surfaces to be moved of the zoom lens, Table 16 shows data about aspheric coefficients of the zoom lens, and FIG. 10 shows aberration diagrams of the zoom lens.

TABLE 13

Example 4 - Lens Data

| Surface No. | Radius of Curvature | Surface Distance | nd | νd |
|---|---|---|---|---|
| 1 | 103.88036 | 1.610 | 1.92286 | 18.90 |
| 2 | 59.15812 | 5.918 | 1.59282 | 68.63 |
| 3 | 1838.34395 | 0.100 | | |
| 4 | 47.72259 | 3.995 | 1.75500 | 52.32 |
| 5 | 130.00395 | DD[5] | | |
| *6 | 360.35602 | 0.450 | 1.51876 | 54.04 |
| 7 | 215.93871 | 1.100 | 1.83481 | 42.73 |
| 8 | 14.84017 | 6.467 | | |
| 9 | −44.50188 | 0.850 | 1.88300 | 40.76 |
| 10 | 100.13723 | 0.460 | | |
| 11 | 31.94919 | 4.700 | 1.92286 | 18.90 |
| 12 | −55.49928 | DD[12] | | |
| *13 | −25.37337 | 1.000 | 1.82080 | 42.71 |
| *14 | −624.86181 | DD[14] | | |
| *15 | 24.70300 | 3.286 | 1.58913 | 61.15 |
| *16 | −60.30917 | 1.100 | | |
| 17 (stop) | ∞ | 3.000 | | |
| 18 | 27.98816 | 4.410 | 1.49700 | 81.54 |
| 19 | −15.48498 | 0.700 | 1.92119 | 23.96 |
| 20 | −50.49745 | 1.500 | | |
| 21 | −48.09361 | 3.010 | 1.91082 | 35.25 |
| 22 | −15.19582 | 0.800 | 1.74320 | 49.34 |
| 23 | 50.77042 | DD[23] | | |
| *24 | 25.37291 | 4.000 | 1.74330 | 49.33 |
| *25 | −24.62087 | 4.500 | | |
| 26 | −23.23930 | 0.810 | 1.83481 | 42.73 |
| 27 | 20.00346 | 3.000 | 1.54814 | 45.79 |
| 28 | 651.99376 | DD[28] | | |
| 29 | −100.01989 | 2.515 | 1.48749 | 70.23 |
| 30 | −44.83191 | 3.000 | | |
| 31 | ∞ | 2.850 | 1.51680 | 64.20 |
| 32 | ∞ | 13.843 | | |

TABLE 14

Example 4 - Specifications (d-line)

|  | Wide Angle | Middle | Telephoto |
|---|---|---|---|
| Zoom Magnification | 1.0 | 2.7 | 7.1 |
| f | 18.59 | 49.43 | 131.43 |
| Bf | 18.72 | 18.72 | 18.72 |
| FNo. | 3.63 | 4.35 | 5.80 |
| 2ω[°] | 82.2 | 32.4 | 12.6 |

TABLE 15

Example 4 - Distances with respect to Zoom

|  | Wide Angle | Middle | Telephoto |
|---|---|---|---|
| DD[5] | 0.500 | 18.996 | 35.242 |
| DD[12] | 3.381 | 4.429 | 7.642 |
| DD[14] | 18.651 | 8.449 | 1.164 |
| DD[23] | 6.934 | 3.962 | 2.820 |
| DD[28] | 2.000 | 20.906 | 40.231 |

TABLE 16

Example 4 - Aspheric Coefficients

| Surface No. | 6 | 13 | 14 |
|---|---|---|---|
| KA | 1.0000000E+00 | 1.0000000E+00 | 1.0000000E+00 |
| A3 | −3.1914853E−06 | −1.2524613E−04 | −1.4444755E−04 |
| A4 | 1.3104421E−05 | −1.8971325E−05 | −6.0280369E−06 |
| A5 | 3.7037981E−07 | −1.2562888E−06 | −1.8138685E−06 |
| A6 | −6.4078545E−08 | 4.4098868E−07 | 1.4598212E−07 |
| A7 | 5.9965760E−10 | 2.2272942E−08 | 5.7808381E−08 |
| A8 | 7.7292645E−11 | −2.1891153E−09 | 8.4800715E−10 |
| A9 | 4.3413919E−13 | −2.9013364E−10 | −6.7804692E−10 |
| A10 | −8.4606501E−14 | −7.4405934E−12 | −3.7556369E−11 |
| A11 | 0.0000000E+00 | 1.1691866E−12 | 2.7173908E−12 |
| A12 | 0.0000000E+00 | 3.4384694E−13 | 1.3090765E−12 |
| A13 | 0.0000000E+00 | 1.4485595E−14 | −6.1902183E−14 |
| A14 | 0.0000000E+00 | −7.4042588E−15 | −5.6773798E−14 |
| A15 | 0.0000000E+00 | 1.5272525E−14 | 1.0054082E−14 |
| A16 | 0.0000000E+00 | 1.9197154E−17 | −4.9347072E−16 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

| Surface No. | 15 | 16 | 24 |
|---|---|---|---|
| KA | 1.0000000E+00 | 1.0000000E+00 | 1.0000000E+00 |
| A3 | −1.4108481E−05 | −4.6893838E−06 | 4.4349522E−07 |
| A4 | 8.3073286E−07 | 4.9262752E−07 | −1.2794733E−05 |
| A5 | −2.6352225E−07 | 1.9179768E−07 | −6.1804577E−07 |
| A6 | 2.0884637E−08 | −7.6707902E−08 | 1.7360799E−07 |
| A7 | −1.3321442E−08 | 1.3827505E−09 | 1.2762260E−08 |
| A8 | 1.2128720E−09 | 1.9527379E−09 | −2.3649643E−09 |
| A9 | 4.0867175E−10 | −5.2711634E−11 | −2.3060510E−10 |
| A10 | −5.1230441E−11 | −2.1606078E−11 | 2.9903223E−11 |
| A11 | 0.0000000E+00 | 0.0000000E+00 | 0.0000000E+00 |
| A12 | 0.0000000E+00 | 0.0000000E+00 | 0.0000000E+00 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

TABLE 16-continued

Example 4 - Aspheric Coefficients

| Surface No. | 25 |
|---|---|
| KA | 1.0000000E+00 |
| A3 | 1.5647717E−05 |
| A4 | 1.5538889E−05 |
| A5 | 1.2238260E−06 |
| A6 | 3.6776488E−08 |
| A7 | −2.1895689E−10 |
| A8 | −1.2447311E−09 |
| A9 | −7.5068411E−11 |
| A10 | 1.6053955E−11 |
| A11 | 0.0000000E+00 |
| A12 | 0.0000000E+00 |
| A13 | 0.0000000E+00 |
| A14 | 0.0000000E+00 |
| A15 | 0.0000000E+00 |
| A16 | 0.0000000E+00 |
| A17 | 0.0000000E+00 |
| A18 | 0.0000000E+00 |
| A19 | 0.0000000E+00 |
| A20 | 0.0000000E+00 |

Next, a zoom lens of Example 5 is described. The zoom lens of Example 5 has a five-group configuration including first to fifth lens groups G1 to G5 in this order from the object side. FIG. 6 is a sectional view illustrating the lens configuration of the zoom lens of Example 5. Table 17 shows basic lens data of the zoom lens of Example 5, Table 18 shows data about specifications of the zoom lens, Table 19 shows data about distances between surfaces to be moved of the zoom lens, Table 20 shows data about aspheric coefficients of the zoom lens, and FIG. 11 shows aberration diagrams of the zoom lens.

TABLE 17

Example 5 - Lens Data

| Surface No. | Radius of Curvature | Surface Distance | nd | νd |
|---|---|---|---|---|
| 1 | 89.72339 | 1.610 | 1.92286 | 18.90 |
| 2 | 53.51146 | 5.618 | 1.59282 | 68.63 |
| 3 | 313.61063 | 0.100 | | |
| 4 | 49.31365 | 3.916 | 1.77250 | 49.60 |
| 5 | 148.63382 | DD[5] | | |
| *6 | 165.03262 | 1.550 | 1.85135 | 40.10 |
| 7 | 14.08802 | 6.179 | | |
| 8 | −58.41497 | 0.850 | 1.83481 | 42.73 |
| 9 | 41.01028 | 0.100 | | |
| 10 | 26.47227 | 4.900 | 1.92286 | 20.88 |
| 11 | −43.97987 | DD[11] | | |
| *12 | −24.56194 | 1.000 | 1.82080 | 42.71 |
| *13 | 2065.44103 | DD[13] | | |
| 14 (stop) | ∞ | 1.500 | | |
| *15 | 23.59887 | 3.013 | 1.51760 | 63.50 |
| *16 | −79.28234 | 1.945 | | |
| 17 | 34.02971 | 6.245 | 1.49700 | 81.54 |
| 18 | −15.55765 | 0.700 | 1.92119 | 23.96 |
| 19 | −37.11178 | 1.533 | | |
| 20 | −47.09441 | 2.710 | 1.91082 | 35.25 |
| 21 | −15.22428 | 0.800 | 1.75500 | 52.32 |
| 22 | 60.44638 | DD[22] | | |
| *23 | 27.09447 | 4.000 | 1.69350 | 53.20 |
| *24 | −23.20068 | 4.000 | | |
| 25 | −28.84118 | 0.810 | 1.83481 | 42.73 |
| 26 | 20.00000 | 3.062 | 1.51742 | 52.43 |
| 27 | −133.78822 | 10.180 | | |
| 28 | ∞ | 2.850 | 1.51680 | 64.20 |
| 29 | ∞ | DD[29] | | |

TABLE 18

Example 5 - Specifications (d-line)

|  | Wide Angle | Middle | Telephoto |
|---|---|---|---|
| Zoom Magnification | 1.0 | 2.7 | 7.1 |
| f | 18.60 | 49.45 | 131.47 |
| Bf | 16.25 | 34.04 | 52.62 |
| FNo. | 3.62 | 4.45 | 5.77 |
| 2ω[°] | 82.2 | 32.4 | 12.4 |

TABLE 19

Example 5 - Distances with respect to Zoom

|  | Wide Angle | Middle | Telephoto |
|---|---|---|---|
| DD[5] | 0.803 | 20.040 | 36.570 |
| DD[11] | 2.293 | 3.282 | 6.997 |
| DD[13] | 20.778 | 9.002 | 1.148 |
| DD[22] | 5.956 | 2.647 | 1.488 |
| DD[29] | 14.370 | 32.161 | 50.734 |

TABLE 20

Example 5 - Aspheric Coefficients

| Surface No. | 6 | 12 | 13 |
|---|---|---|---|
| KA | 1.0000000E+00 | 1.0000000E+00 | 1.0000000E+00 |
| A3 | 1.1385673E−05 | −5.2163858E−05 | −7.4424939E−05 |
| A4 | 1.1324415E−06 | −1.7086452E−05 | −6.8987344E−06 |
| A5 | 6.1840057E−07 | −9.3966775E−07 | −2.5528790E−06 |
| A6 | −4.5574710E−08 | 3.4949670E−07 | 1.7034394E−07 |
| A7 | 1.2538773E−10 | 1.1105935E−08 | 6.5173513E−08 |
| A8 | 5.2137037E−11 | −1.7641515E−09 | 4.4797421E−10 |
| A9 | 2.8677689E−12 | −1.7773251E−10 | −8.0358868E−10 |
| A10 | −1.7608831E−13 | −2.8926118E−12 | −5.3436213E−11 |
| A11 | 0.0000000E+00 | 4.8867784E−13 | −5.5531369E−13 |
| A12 | 0.0000000E+00 | 1.4491338E−13 | 1.0407790E−13 |
| A13 | 0.0000000E+00 | 8.9668702E−15 | 1.2684742E−13 |
| A14 | 0.0000000E+00 | −1.6729028E−15 | −1.5318882E−14 |
| A15 | 0.0000000E+00 | 1.0380640E−16 | −2.3629060E−16 |
| A16 | 0.0000000E+00 | −8.0456611E−18 | 2.5060741E−17 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

| Surface No. | 15 | 16 | 23 |
|---|---|---|---|
| KA | 1.0000000E+00 | 1.0000000E+00 | 1.0000000E+00 |
| A3 | −5.0223685E−06 | 1.0811270E−05 | −1.1616063E−06 |
| A4 | −7.0174214E−06 | −9.3611116E−06 | −1.7297596E−05 |
| A5 | 9.6418958E−07 | 2.3546382E−06 | −7.7252873E−07 |
| A6 | 1.8350273E−08 | −1.0020231E−07 | 1.5534380E−07 |
| A7 | −2.2739081E−08 | −1.9471198E−08 | 1.2980565E−08 |

TABLE 20-continued

Example 5 - Aspheric Coefficients

| | | | |
|---|---|---|---|
| A8 | 2.8473450E−11 | 1.2250662E−09 | −2.0516125E−09 |
| A9 | 4.1758486E−10 | 8.6116305E−11 | −2.1073452E−10 |
| A10 | −1.7907428E−11 | 3.5752192E−12 | 2.3710746E−11 |
| A11 | 0.0000000E+00 | 0.0000000E+00 | 0.0000000E+00 |
| A12 | 0.0000000E+00 | 0.0000000E+00 | 0.0000000E+00 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

| Surface No. | 24 |
|---|---|
| KA | 1.0000000E+00 |
| A3 | 1.8619109E−05 |
| A4 | 1.5270991E−05 |
| A5 | 1.0518202E−06 |
| A6 | 2.8927266E−08 |
| A7 | 7.5532190E−10 |
| A8 | −9.4989857E−10 |
| A9 | −4.6357926E−11 |
| A10 | 8.7467998E−12 |
| A11 | 0.0000000E+00 |
| A12 | 0.0000000E+00 |
| A13 | 0.0000000E+00 |
| A14 | 0.0000000E+00 |
| A15 | 0.0000000E+00 |
| A16 | 0.0000000E+00 |
| A17 | 0.0000000E+00 |
| A18 | 0.0000000E+00 |
| A19 | 0.0000000E+00 |
| A20 | 0.0000000E+00 |

Table 21 shows values corresponding to the condition expressions (1) to (5) of the imaging lenses of Examples 1 to 5. In all the examples, the d-line is used as a reference wavelength, and the values shown in Table 21 below are with respect to the reference wavelength.

TABLE 21

| No. | Condition Expression | Example 1 | Example 2 | Example 3 | Example 4 | Example 5 |
|---|---|---|---|---|---|---|
| (1) | fW/f1 | 0.241 | 0.246 | 0.255 | 0.243 | 0.237 |
| (2) | f5/f5B | −1.392 | −2.173 | −2.186 | −2.210 | −1.697 |
| (3) | vd4Bn − vd4Bp | 12.69 | 12.69 | 15.72 | 14.09 | 17.07 |
| (4) | Nd4Bp − Nd4Bn | 0.32769 | 0.32769 | 0.26707 | 0.16762 | 0.15582 |
| (5) | f1/f23T | −5.875 | −5.985 | −6.129 | −6.050 | −6.163 |

As can be seen from the above-described data, all the zoom lenses of Examples 1 to 5 satisfy the condition expressions (1) to (5), and have a short entire length while achieving a high magnification of around 7×.

Figure 12A:
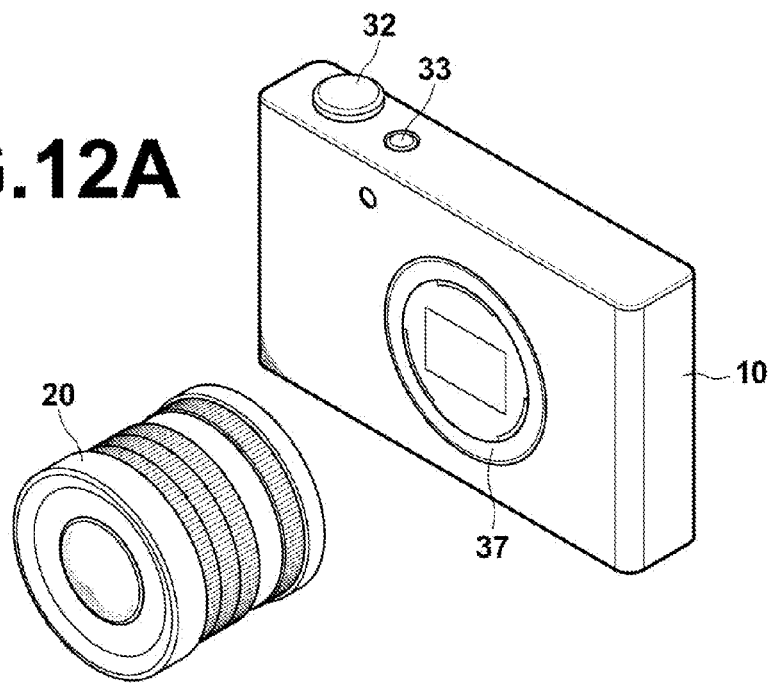
FIGS. 12A and 12B are diagrams illustrating the schematic configuration of an imaging apparatus according to an embodiment of the invention.
Figure 12B:
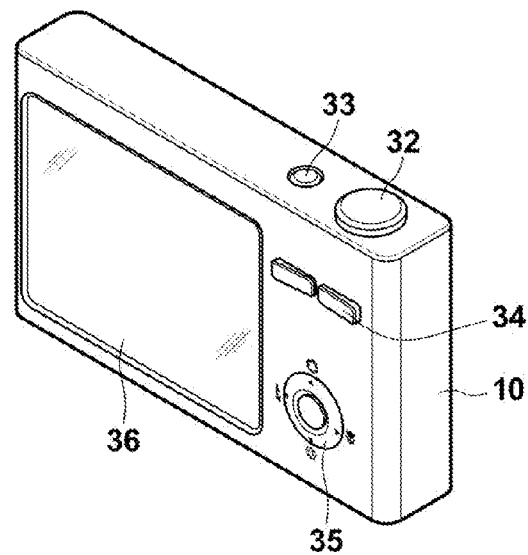

Next, an imaging apparatus according to an embodiment of the invention is described. FIGS. 12A and 12B show, as one example of the imaging apparatus of the embodiment of the invention, the appearance of one configuration example of a mirrorless single-lens camera employing the zoom lens of the embodiment of the invention.

Specifically, FIG. 12A shows the appearance of the camera viewed from the front side, and FIG. 12B shows the appearance of the camera viewed from the rear side. The camera includes a camera body 10, and a release button 32 and a power button 33 disposed on the upper side of the camera body 10. A display section 36 and operation sections 34 and 35 are disposed on the rear side of the camera body 10. The display section 36 displays taken images.

At the center of the front side of the camera body 10, an imaging aperture, through which light from the subject enters, is formed, and a mount 37 is disposed at a position corresponding to the imaging aperture. A replaceable lens 20 is mounted on the camera body 10 via the mount 37. The replaceable lens 20 is formed by a lens member contained in a lens barrel. In the camera body 10, an image sensor, such as a CCD, for outputting an image signal according to an image of the subject formed by the replaceable lens 20, a signal processing circuit for processing the image signal outputted from the image sensor to generate an image, a recording medium for recording the generated image, etc., are disposed. With this camera, a still image of one frame is taken when the release button 32 is pressed, and the image data obtained by the imaging operation is recorded in the recording medium (not shown) in the camera body 10.

When the zoom lens according to the embodiment of the invention is used as the replaceable lens 20 for such a mirrorless single-lens camera, the entire length of the camera can be reduced to make the camera compact, and high magnification images can be obtained.

The present invention has been described with reference to the embodiments and the examples. However, the invention is not limited to the above-described embodiments and examples, and various modifications may be made to the invention. For example, the values of the radius of curvature, the surface distance, the refractive index, the Abbe number, etc., of each lens element are not limited to the values shown in the above-described numerical examples and may take different values.

What is claimed is:

1. A zoom lens comprising, consecutively in order from an object side, a first lens group having a positive refractive power, a second lens group having a negative refractive power, a third lens group having a negative refractive power, a fourth lens group having a positive refractive power, and a fifth lens group having a positive refractive power, wherein the first lens group, the second lens group, the third lens group, the fourth lens group, and the fifth lens group are moved to change distances therebetween during magnification change, a distance between the first lens group and the second lens group at a telephoto end is larger than that at a wide-angle end, a distance between the second lens group and the third lens group at the telephoto end is larger than that at the wide-angle end, a distance between the third lens group and the fourth lens group at the telephoto end is smaller than that at the wide-angle end, and a distance between the fourth lens group and the fifth lens group at the telephoto end is smaller than that at the wide-angle end, positions of the first lens group, the second lens group, the fourth lens group, and the fifth lens group at the telephoto end are closer to the object side than their positions at the wide-angle end, the first lens group consists essentially of, in order from the object side, a negative meniscus lens with the concave surface toward an image side, a positive lens, and a positive lens, the second lens group consists essentially of, in order from the object side, a negative lens with the image-side surface having an absolute value of radius of curvature smaller than that of the object side surface thereof, a biconcave lens, and a biconvex lens, the third lens group consists essentially of a negative lens with the object side surface having an absolute value of radius of curvature smaller than that of the image-side surface thereof, and the third lens group is moved during focusing, the fifth lens group consists essentially of, in order from the object side, a fifth A lens group having a positive refractive power and consisting essentially of a biconvex lens, and a fifth B lens group having a negative refractive power and consisting essentially of, in order from the object side, a biconcave lens and a biconvex lens, and the condition expression (1) below is satisfied:

$$0.22 < fW/f1 < 0.27 \quad (1),$$

where fW is a focal length of the entire system at the wide-angle end, and f1 is a focal length of the first lens group.

2. The zoom lens as claimed in claim 1, wherein the condition expression (2) below is satisfied:

$$-4 < f5/f5B < -0.7 \quad (2),$$

where f5 is a focal length of the fifth lens group, and f5B is a focal length of the fifth B lens group.

3. The zoom lens as claimed in claim 1, wherein the fourth lens group consists essentially of, in order from the object side, a fourth A lens group having a positive refractive power, and a fourth B lens group having a negative refractive power, and only the fourth B lens group is moved in directions perpendicular to an optical axis to effect image stabilization.

4. The zoom lens as claimed in claim 3, wherein the fourth B lens group consists essentially of a positive lens and a negative lens.

5. The zoom lens as claimed in claim 4, wherein the condition expression (3) below is satisfied:

$$11.5 < vd4Bn - vd4Bp < 20 \quad (3),$$

where vd4Bn is an Abbe number with respect to the d-line of the negative lens forming the fourth B lens group, and vd4Bp is an Abbe number with respect to the d-line of the positive lens forming the fourth B lens group.

6. The zoom lens as claimed in claim 4, wherein the condition expression (4) below is satisfied:

$$0.15 < Nd4Bp - Nd4Bn < 0.5 \quad (4),$$

where Nd4Bp is a refractive index with respect to the d-line of the positive lens forming the fourth B lens group, and Nd4Bn is a refractive index with respect to the d-line of the negative lens forming the fourth B lens group.

7. The zoom lens as claimed in claim 3, wherein the fourth B lens group consists essentially of, in order from the object side, a positive lens and a negative lens, the positive lens and the negative lens of the fourth B lens group are cemented together, and the cemented surface of the lenses cemented together is convex toward the image side and has the smallest absolute value of radius of curvature among the surfaces of the lenses forming the fourth B lens group.

8. The zoom lens as claimed in claim 1, wherein the biconcave lens and the biconvex lens of the fifth B lens group are cemented together.

9. The zoom lens as claimed in claim 1, wherein the condition expression (5) below is satisfied:

$$-8 < f1/f23T < -5.5 \tag{5},$$

where f1 is a focal length of the first lens group, and f23T is a combined focal length of the second lens group and the third lens group at the telephoto end.

10. The zoom lens as claimed in claim 3, wherein the fourth A lens group consists essentially of, in order from the object side, a positive lens, and a positive lens and a negative lens which are cemented together.

11. The zoom lens as claimed in claim 1, wherein the third lens group is moved toward the object side during focusing on a closer object.

12. The zoom lens as claimed in claim 1, wherein the negative lens of the third lens group has aspheric surfaces on both sides thereof.

13. The zoom lens as claimed in claim 1, further comprising a sixth lens group having a positive refractive power at the most image-side position.

14. The zoom lens as claimed in claim 1, wherein the condition expression (1-1) below is satisfied:

$$0.23 < fW/f1 < 0.26 \tag{1-1}.$$

15. The zoom lens as claimed in claim 1, wherein the condition expression (2-1) below is satisfied:

$$-4 < f5/f5B < -1 \tag{2-1},$$

where f5 is a focal length of the fifth lens group, and f5B is a focal length of the fifth B lens group.

16. The zoom lens as claimed in claim 5, wherein the condition expression (3-1) below is satisfied:

$$12 < vd4Bn - vd4Bp < 18 \tag{3-1},$$

where vd4Bn is an Abbe number with respect to the d-line of the negative lens forming the fourth B lens group, and vd4Bp is an Abbe number with respect to the d-line of the positive lens forming the fourth B lens group.

17. The zoom lens as claimed in claim 6, wherein the condition expression (4-1) below is satisfied:

$$0.15 < Nd4Bp - Nd4Bn < 0.4 \tag{4-1},$$

where Nd4Bp is a refractive index with respect to the d-line of the positive lens forming the fourth B lens group, and Nd4Bn is a refractive index with respect to the d-line of the negative lens forming the fourth B lens group.

18. The zoom lens as claimed in claim 1, wherein the condition expression (5-1) below is satisfied:

$$-6.4 < f1/f23T < -5.5 \tag{5-1},$$

where f1 is a focal length of the first lens group, and f23T is a combined focal length of the second lens group and the third lens group at the telephoto end.

19. An imaging apparatus comprising the zoom lens as claimed in claim 1.

* * * * *